(12) United States Patent
Fujio et al.

(10) Patent No.: US 8,808,097 B2
(45) Date of Patent: Aug. 19, 2014

(54) FIXED TYPE CONSTANT VELOCITY UNIVERSAL JOINT

(71) Applicants: Teruaki Fujio, Shizuoka (JP); Tatsuro Sugiyama, Shizuoka (JP)

(72) Inventors: Teruaki Fujio, Shizuoka (JP); Tatsuro Sugiyama, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/038,030

(22) Filed: Sep. 26, 2013

(65) Prior Publication Data

US 2014/0038733 A1 Feb. 6, 2014

Related U.S. Application Data

(62) Division of application No. 13/394,356, filed as application No. PCT/JP2010/067268 on Oct. 1, 2010, now Pat. No. 8,568,245.

(30) Foreign Application Priority Data

Oct. 8, 2009 (JP) ................. 2009-234477

(51) Int. Cl.
*F16D 3/227* (2006.01)
*F16D 3/2245* (2011.01)
*F16D 3/224* (2011.01)
*F16D 3/223* (2011.01)

(52) U.S. Cl.
CPC ...... *F16D 3/223* (2013.01); *F16D 2003/22309* (2013.01); *F16D 2003/22303* (2013.01); *F16D 3/2245* (2013.01); *F16D 3/224* (2013.01); *Y10S 464/906* (2013.01)
USPC .......................... 464/144; 464/906

(58) Field of Classification Search
USPC .................... 464/144–146, 906
See application file for complete search history.

(56) References Cited

U.S. PATENT DOCUMENTS 2,046,584 A 7/1936 Rzeppa
2,875,600 A 3/1959 Miller, Jr.
(Continued)

FOREIGN PATENT DOCUMENTS

CN 1910380 2/2007
FR 1 297 745 7/1962
(Continued)

OTHER PUBLICATIONS

International Search Report issued Nov. 16, 2010 in International (PCT) Application No. PCT/JP2010/067268.
(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A fixed type constant velocity universal joint prevents heat generation when a high load is applied or during high-speed rotation to improve durability, and suppresses a contact resistance between a cage and inner and outer races to improve constant velocity performance. Curvature centers of track grooves of outer and inner joint members have an offset of 0 in an axial direction. Track grooves of the outer and inner joint members, which are tilted in opposite directions from each other with respect to an axis line, are alternately formed in a circumferential direction. An outer surface of the inner joint member is a spherical surface to be brought into sliding contact with an inner spherical surface of the cage. An inner surface of the outer joint member is a cylindrical surface.

9 Claims, 26 Drawing Sheets

(56) References Cited

U.S. PATENT DOCUMENTS

| | | | |
|---|---|---|---|
| 5,531,643 A | 7/1996 | Welschof | |
| 6,120,382 A | 9/2000 | Sone et al. | |
| 6,227,979 B1 | 5/2001 | Yamamoto et al. | |
| 6,497,622 B1 | 12/2002 | Bilz et al. | |
| 6,672,965 B2 * | 1/2004 | Hildebrandt et al. | 464/145 |
| 2002/0032064 A1 | 3/2002 | Sone et al. | |

FOREIGN PATENT DOCUMENTS

| | | | |
|---|---|---|---|
| GB | 995137 | | 6/1965 |
| JP | 3300663 | | 7/2002 |
| JP | 2004-332815 | | 11/2004 |
| JP | 2004332815 | * | 11/2004 |
| JP | 3859264 | | 12/2006 |
| JP | 2007239778 | * | 9/2007 |
| JP | 2007-255463 | | 10/2007 |
| JP | 2010043667 | * | 2/2010 |
| JP | 2011080555 | * | 4/2011 |

OTHER PUBLICATIONS

International Preliminary Report on Patentability and Written Opinion of the International Searching Authority issued May 18, 2012 in International (PCT) Application No. PCT/JP2010/067268.

Supplementary European Search Report issued Mar. 15, 2013 in European Patent Application No. 10821939.5.

Chinese Office Action, with English translation, issued Jan. 21, 2014 in corresponding Chinese Patent Application No. 201080045187.7.

* cited by examiner

FIXED TYPE CONSTANT VELOCITY UNIVERSAL JOINT

BACKGROUND OF THE INVENTION

1. Technical Field

The present invention relates to a constant velocity universal joint which is used in, for example, a power transmission system for automobiles and various industrial machines.

2. Background Art

For example, a fixed type constant velocity universal joint can be taken as an example of a constant velocity universal joint used as means for transmitting a rotational force from an engine to wheels of an automobile at a constant velocity. The fixed type constant velocity universal joint has a structure in which two shafts, a driving shaft and a driven shaft, are coupled to each other and which is capable of transmitting rotational torque at a constant velocity even when the two shafts form an operating angle. Generally, a Birfield type (BJ) constant velocity universal joint and an undercut-free type (UJ) constant velocity universal joint have been widely known as the above-mentioned constant velocity universal joint.

As illustrated in FIG. 48, the fixed type constant velocity universal joint of the BJ type includes: an outer race 3 having an inner spherical surface 1 in which a plurality of track grooves 2 are equiangularly formed along an axial direction, the outer race 3 serving as an outer joint member; an inner race 6 having an outer spherical surface 4 in which a plurality of track grooves 5 are equiangularly formed in pairs with the track grooves 2 of the outer race 3 along the axial direction, the inner race 6 serving as an inner joint member; a plurality of balls 7 interposed between the track grooves 2 of the outer race 3 and the track grooves 5 of the inner race 6, for transmitting torque; and a cage 8 interposed between the inner spherical surface 1 of the outer race 3 and the outer spherical surface 4 of the inner race 6, for retaining the balls 7. In the cage 8, a plurality of pockets 9 for housing the balls 7 are arranged along a circumferential direction.

At an inner surface of a hole portion of the inner race 6, a female spline 10 is formed. A male spline 12 of a shaft 11 is fitted into the hole portion of the inner race 6, to thereby fit the male spline 12 to the female spline 10 of the inner race 6. Then, a stop ring 13 for preventing dropping is fitted to an end portion of the male spline 12.

In order to close an opening portion of the outer race 3, an end cap 15 and a flexible boot 16 are mounted. The flexible boot 16 is formed of a bellow 18 made of a rubber material or a resin material, and a cylindrical adapter 19 made of a metal. The bellow 18 includes a small diameter end portion 18a fitted onto the shaft 11, a large diameter end portion 18b connected to the adapter 19, and a bent portion 18c provided between the small diameter end portion 18a and the large diameter end portion 18b. The small diameter end portion 18a of the bellow 18 is fixed to the shaft 11 by being fastened by a band 20. The adapter 19 includes a swage portion 19a swaged and fixed to the large diameter end portion 18b of the bellow 18, and an annular flange portion 19b fitted to the outer race 3. Note that, the end cap 15 includes a main body portion 15a as a bottomed short cylindrical member, and an annular flange portion 15b fitted to the outer race 3.

Further, a curvature center O2 of each of the track grooves 5 of the inner race 6 is shifted from a joint center O on the end cap side in the axial direction. Further, a curvature center O1 of each of the track grooves 2 of the outer race 3 is shifted from the joint center O on the flexible boot side in the axial direction. That is, the curvature center O2 of the track groove 5 of the inner race 6 and the curvature center O1 of the track groove 2 of the outer race 3 are offset to opposite sides in the axial direction by equal distances F and F with respect to the joint center O.

Conventionally, there has been proposed an 8-ball constant velocity universal joint (Japanese Patent No. JP 3859264 B) in which the ball diameter is reduced for the purpose of achieving high performance and reducing the size, so as to suppress reduction in load capacity per one ball. Further, there are proposals of forming the tracks of the inner and outer races into a spiral form or tilting the tracks in the axial direction, to thereby set the adjacent tracks to be plane-symmetrical. Thus, the contact force between the ball and the track portion of the inner or outer race can be reduced, thereby enhancing durability (Japanese Patent No. JP 3300663 B).

In the constant velocity universal joint described in Japanese Patent No. JP 3859264 B above, in order to enable the cage 8 to smoothly operate, as described above, the curvature center O2 of the track groove 5 of the inner race 6 and the curvature center O1 of the track groove 2 of the outer race 3 are offset to opposite sides in the axial direction by equal distances F and F with respect to the joint center O. Therefore, as illustrated in FIG. 49, the ball 7 forms a wedge angle τ under a state in which the ball 7 is sandwiched between the tracks of the inner and outer races (ball track which is formed of the track groove 5 of the inner race 6 and the track groove 2 of the outer race 3 and in which the ball is interposed). The wedge angle τ enables the ball 7 to push the pocket 9, and thus the cage 8 is operated smoothly. Note that, in FIG. 49, P1 represents a contact point of the ball 7 with respect to the track groove 2 of the outer race 3, and P2 represents a contact point of the ball 7 with respect to the track groove 5 of the inner race 6.

As described above, the offset (track offset) is important in order to operate the cage 8, but as illustrated in FIG. 49, a force W is applied only in a direction of an opening portion of the joint, and hence inner and outer spherical surfaces 8a and 8b of the cage are in a state of being brought into contact with the inner spherical surface 1 of the outer race 3 and the outer spherical surface 4 of the inner race 6. Therefore, when the joint is subjected to high load or rotated at high speed, this contact causes heat generation in the joint, and the durability may reduce.

Further, also in the constant velocity universal joint described in Japanese Patent No. JP 3300663 B above, in addition to the track offset, the tracks of the inner and outer races are formed into a spiral form or tilted in the axial direction, to thereby reduce the ball contact force to the tracks of the inner and outer races and further reduce the force to be applied to the cage. However, even with such a structure, when the joint is subjected to high load or during high-speed rotation, heat may be generated due to the contact between the inner spherical surfaces of the cage and the outer spherical surface of the inner race or the outer spherical surfaces of the cage and the inner spherical surface of the outer race, which may decrease the durability.

SUMMARY OF THE INVENTION

In view of the circumstances as described above, the present invention provides a fixed type constant velocity universal joint, which is capable of preventing heat generation when high load is applied or during high-speed rotation to improve the durability, and further, suppressing a contact resistance between the cage and the inner and outer races to improve the constant velocity performance.

A first fixed type constant velocity universal joint according to the present invention includes: an outer joint member including an inner surface provided with a track groove having a bottom surface being a circular arc surface; an inner joint member including an outer surface provided with a track groove having a bottom surface being a circular arc surface; a plurality of torque transmitting balls each arranged in a ball track formed of a pair of the track groove of the outer joint member and the track groove of the inner joint member; and a cage interposed between the inner surface of the outer joint member and the outer surface of the inner joint member, for retaining the plurality of torque transmitting balls. A curvature center of the track groove of the outer joint member and a curvature center of the track groove of the inner joint member have an offset of 0 in an axial direction. The track groove of the outer joint member and the track groove of the inner joint member, which are tilted in opposite directions from each other with respect to an axis line, are alternately formed in a circumferential direction. The outer surface of the inner joint member is a spherical surface which is to be brought into sliding contact with an inner spherical surface of the cage, and the inner surface of the outer joint member is a cylindrical surface.

Further, in the first fixed type constant velocity universal joint, the inner surface of the outer joint member may include an opening portion having a tapered portion toward an opening side.

A second fixed type constant velocity universal joint according to the present invention includes: an outer joint member including an inner surface provided with a track groove having a bottom surface being a circular arc surface; an inner joint member including an outer surface provided with a track groove having a bottom surface being a circular arc surface; a plurality of torque transmitting balls each arranged in a ball track formed of a pair of the track groove of the outer joint member and the track groove of the inner joint member; and a cage interposed between the inner surface of the outer joint member and the outer surface of the inner joint member, for retaining the plurality of torque transmitting balls. A curvature center of the track groove of the outer joint member and a curvature center of the track groove of the inner joint member have an offset of 0 in an axial direction. The track groove of the outer joint member and the track groove of the inner joint member, which are tilted in opposite directions from each other with respect to an axis line, are alternately formed in a circumferential direction. The outer surface of the inner joint member is a spherical surface which is to be brought into sliding contact with an inner spherical surface of the cage, and the inner surface of the outer joint member is a spherical surface which forms a gap together with an outer spherical surface of the cage.

A third fixed type constant velocity universal joint according to the present invention includes: an outer joint member including an inner surface provided with a track groove having a bottom surface being a circular arc surface; an inner joint member including an outer surface provided with a track groove having a bottom surface being a circular arc surface; a plurality of torque transmitting balls each arranged in a ball track formed of a pair of the track groove of the outer joint member and the track groove of the inner joint member; and a cage interposed between the inner surface of the outer joint member and the outer surface of the inner joint member, for retaining the plurality of torque transmitting balls. A curvature center of the track groove of the outer joint member and a curvature center of the track groove of the inner joint member have an offset of 0 in an axial direction. The track groove of the outer joint member and the track groove of the inner joint member, which are tilted in opposite directions from each other with respect to an axis line, are alternately formed in a circumferential direction. The outer surface of the inner joint member is a spherical surface which is to be brought into sliding contact with an inner spherical surface of the cage, and the inner surface of the outer joint member is an elliptical surface which forms a gap together with an outer spherical surface of the cage.

A fourth fixed type constant velocity universal joint according to the present invention includes: an outer joint member including an inner surface provided with a track groove having a bottom surface being a circular arc surface; an inner joint member including an outer surface provided with a track groove having a bottom surface being a circular arc surface; a plurality of torque transmitting balls each arranged in a ball track formed of a pair of the track groove of the outer joint member and the track groove of the inner joint member; and a cage interposed between the inner surface of the outer joint member and the outer surface of the inner joint member, for retaining the plurality of torque transmitting balls. A curvature center of the track groove of the outer joint member and a curvature center of the track groove of the inner joint member have an offset of 0 in an axial direction. The track groove of the outer joint member and the track groove of the inner joint member, which are tilted in opposite directions from each other with respect to an axis line, are alternately formed in a circumferential direction. The inner surface of the outer joint member is a spherical surface which is to be brought into sliding contact with an outer spherical surface of the cage, and the outer surface of the inner joint member is a cylindrical surface.

A fifth fixed type constant velocity universal joint according to the present invention includes: an outer joint member including an inner surface provided with a track groove having a bottom surface being a circular arc surface; an inner joint member including an outer surface provided with a track groove having a bottom surface being a circular arc surface; a plurality of torque transmitting balls each arranged in a ball track formed of a pair of the track groove of the outer joint member and the track groove of the inner joint member; and a cage interposed between the inner surface of the outer joint member and the outer surface of the inner joint member, for retaining the plurality of torque transmitting balls. A curvature center of the track groove of the outer joint member and a curvature center of the track groove of the inner joint member have an offset of 0 in an axial direction. The track groove of the outer joint member and the track groove of the inner joint member, which are tilted in opposite directions from each other with respect to an axis line, are alternately formed in a circumferential direction. The inner surface of the outer joint member is a spherical surface which is to be brought into sliding contact with an outer spherical surface of the cage, and the outer surface of the inner joint member is a spherical surface which forms a gap together with an inner spherical surface of the cage.

A sixth fixed type constant velocity universal joint according to the present invention includes: an outer joint member including an inner surface provided with a track groove having a bottom surface being a circular arc surface; an inner joint member including an outer surface provided with a track groove having a bottom surface being a circular arc surface; a plurality of torque transmitting balls each arranged in a ball track formed of a pair of the track groove of the outer joint member and the track groove of the inner joint member; and a cage interposed between the inner surface of the outer joint member and the outer surface of the inner joint member, for retaining the plurality of torque transmitting balls. A curvature center of the track groove of the outer joint member and a curvature center of the track groove of the inner joint member have an offset of 0 in an axial direction. The track groove of the outer joint member and the track groove of the inner joint member, which are tilted in opposite directions from each other with respect to an axis line, are alternately formed in a circumferential direction. The inner surface of the outer joint member is a spherical surface which is to be brought into sliding contact with an outer spherical surface of the cage, and the outer surface of the inner joint member is an elliptical surface which forms a gap together with an inner spherical surface of the cage.

According to the fixed type constant velocity universal joint of the present invention, the track offset is set to 0, and the adjacent track grooves are alternately intersected. Thus, forces alternately act on adjacent pocket portions, and hence wedge angles in opposite directions are alternately generated. Therefore, a cage position is stabilized at a median position of the inner and outer races.

When the inner surface of the outer joint member is a cylindrical surface as in the first fixed type constant velocity universal joint, setting property of the cage into the outer joint member and workability of the outer joint member can be improved. Further, the outer spherical surface of the cage is a convex spherical surface, and hence the inner surface of the outer joint member and the outer spherical surface of the cage have little contact with each other.

When the inner surface of the outer joint member is a spherical surface which forms a gap together with the outer spherical surface of the cage as in the second fixed type constant velocity universal joint, and when the inner surface of the outer joint member is an elliptical surface which forms a gap together with the outer spherical surface of the cage as in the third fixed type constant velocity universal joint, lubrication by a lubricant agent is promoted.

Further, when the outer surface of the inner joint member is a spherical surface which is to be brought into sliding contact with the inner spherical surface of the cage as in the first to third fixed type constant velocity universal joints, the cage position is determined.

When the outer surface of the inner joint member is a cylindrical surface as in the fourth fixed type constant velocity universal joint, setting property of the inner joint member into the cage and workability of the inner joint member can be improved. Further, the inner spherical surface of the cage is a concave spherical surface, and hence the outer surface of the inner joint member and the inner spherical surface of the cage have little contact with each other.

When the outer surface of the inner joint member is a spherical surface which forms a gap together with the inner spherical surface of the cage as in the fifth fixed type constant velocity universal joint, and when the outer surface of the inner joint member is an elliptical surface which forms a gap together with the inner spherical surface of the cage as in the sixth fixed type constant velocity universal joint, lubrication by a lubricant agent is promoted.

Further, when the inner surface of the outer joint member is a spherical surface which is to be brought into sliding contact with the outer spherical surface of the cage as in the fourth to sixth fixed type constant velocity universal joints, the cage position is determined.

In the first to third fixed type constant velocity universal joints, finish working of the inner surface of the outer joint member may be omitted. Further, the inner surface of the outer joint member may be formed by forging, and further, finish working of an outer surface of the cage may be omitted.

In the fourth to sixth fixed type constant velocity universal joints, finish working of the outer surface of the inner joint member may be omitted. Further, the outer surface of the inner joint member may be formed by forging, and further, finish working of an inner surface of the cage may be omitted.

In the above-mentioned fixed type constant velocity universal joints, the track groove may be formed by forging, or may be formed by mechanical working.

In the above-mentioned fixed type constant velocity universal joints, a number of the plurality of torque transmitting balls may be selected among six, eight, and ten.

In the above-mentioned fixed type constant velocity universal joints, the curvature center of the track groove of the outer joint member and the curvature center of the track groove of the inner joint member may be shifted from a joint center in a radial direction. In this case, the curvature center of the track groove of the outer joint member can be displaced in a direction more widely spaced apart from the track groove than the joint center, and the curvature center of the track groove of the outer joint member can be displaced in a direction more approaching the track groove than the joint center.

The above-mentioned fixed type constant velocity universal joints may be used in a propeller shaft for an automobile.

In the fixed type constant velocity universal joint according to the present invention, forces alternately act on adjacent pocket portions, and hence wedge angles in opposite directions are alternately generated. Therefore, the cage position is stabilized at a median position of the inner and outer races. Therefore, the spherical surface contact of the outer and inner spherical surfaces of the cage is suppressed, and it is possible to smoothly operate the joint even when high load is applied or during high-speed rotation, prevent heat generation, and improve the durability.

When the inner surface of the outer joint member is a cylindrical surface as in the first fixed type constant velocity universal joint, setting property of the cage into the outer joint member and workability can be improved. Thus, the production cost can be reduced and the productivity can be improved.

When the inner surface of the outer joint member forms a gap together with the outer spherical surface of the cage as in the second fixed type constant velocity universal joint and the third fixed type constant velocity universal joint, circulation of a lubricant agent is promoted, heat generation is prevented, and durability is improved.

Further, when the outer surface of the inner joint member is a spherical surface which is to be brought into sliding contact with the inner spherical surface of the cage as in the first to third fixed type constant velocity universal joints, the cage position is determined. Even in a case where there is no restriction of the cage by the outer joint member, the function as the fixed type constant velocity universal joint can be stably exerted.

In the second fixed type constant velocity universal joint and the third fixed type constant velocity universal joint, the inner surface of the outer joint member does not contact to the outer spherical surface of the cage, and in the first fixed type constant velocity universal joint, a contact area is small even when the inner surface of the outer joint member is brought into contact with the outer spherical surface of the cage. Therefore, in those fixed type constant velocity universal joints, the inner surface of the outer joint member and the outer spherical surface of the cage do not need to be subjected to high accuracy working such as grinding after heat treatment or hardened steel cutting. Thus, the cost can be reduced.

When the outer surface of the inner joint member is a cylindrical surface as in the fourth fixed type constant velocity universal joint, setting property of the inner joint member into the cage and workability of the inner joint member can be improved. Thus, the production cost can be reduced and the productivity can be improved.

When the outer surface of the inner joint member forms a gap together with the inner spherical surface of the cage as in the fifth fixed type constant velocity universal joint and the sixth fixed type constant velocity universal joint, lubrication by a lubricant agent is promoted, heat generation is prevented, and durability is improved.

When the inner surface of the outer joint member is a spherical surface which is to be brought into sliding contact with the outer spherical surface of the cage as in the fourth to sixth fixed type constant velocity universal joints, the cage position is determined. Even in a case where there is no restriction of the cage by the inner joint member, the function as the fixed type constant velocity universal joint can be stably exerted.

In the fifth fixed type constant velocity universal joint and the sixth fixed type constant velocity universal joint, the outer surface of the inner joint member does not contact to the inner spherical surface of the cage, and in the fourth fixed type constant velocity universal joint, a contact area is small even when the outer surface of the inner joint member is brought into contact with the inner spherical surface of the cage. Therefore, in those fixed type constant velocity universal joints, the outer surface of the inner joint member and the inner spherical surface of the cage do not need to be subjected to high accuracy working such as grinding after heat treatment or hardened steel cutting. Thus, the cost can be reduced and the productivity can be improved.

The number of balls to be used is generally six, but the present invention is also applicable to a fixed type constant velocity universal joint using eight or ten balls. When the number of balls is increased as described above, the joint can be reduced in size and weight while securing the load capacity.

When the curvature centers of the track grooves of the outer joint member and the inner joint member are displaced in a direction more widely spaced apart from the track groove than the joint center, the track groove of the outer joint member can be taken large (deep). Therefore, the load capacity can be increased, and a thickness of an axial end opening portion of the track groove of the inner joint member can be increased, to thereby enable stable connection of the shaft to be fitted into a hole portion of the inner joint member. Further, when the curvature centers of the track grooves of the outer joint member and the inner joint member are displaced in a direction more approaching the track groove than the joint center O, a load capacity of the track groove of the inner joint member can be increased, and the thickness of the outer joint member can be increased. Thus, the strength is stabilized.

In the fixed type constant velocity universal joint according to the present invention, it is possible to smoothly operate the joint even when high load is applied or during high-speed rotation, prevent heat generation, and improve the durability. Therefore, the present invention is suitable for a fixed type constant velocity universal joint used in a propeller shaft for automobiles.

DETAILED DESCRIPTION OF THE INVENTION

Hereinafter, embodiments of the present invention are described with reference to FIGS. 1 to 47.

Figure 1:
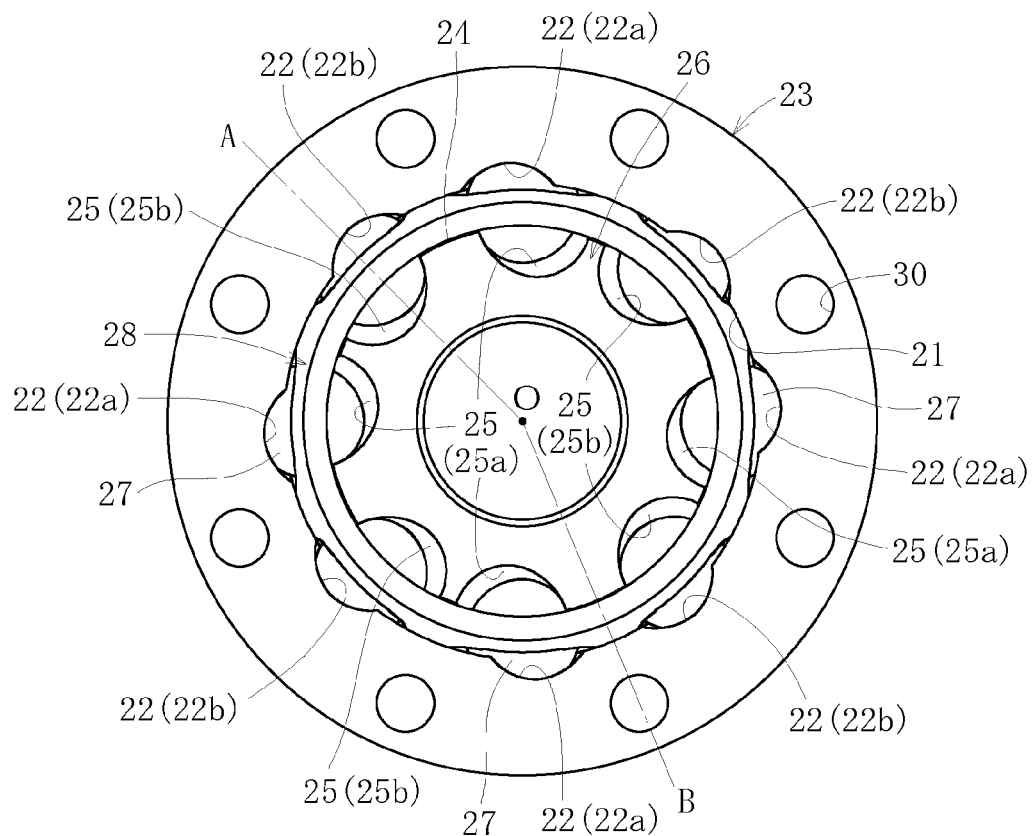
FIG. 1 is a front view of a fixed type constant velocity universal joint, illustrating a first embodiment of the present invention.
Figure 2:
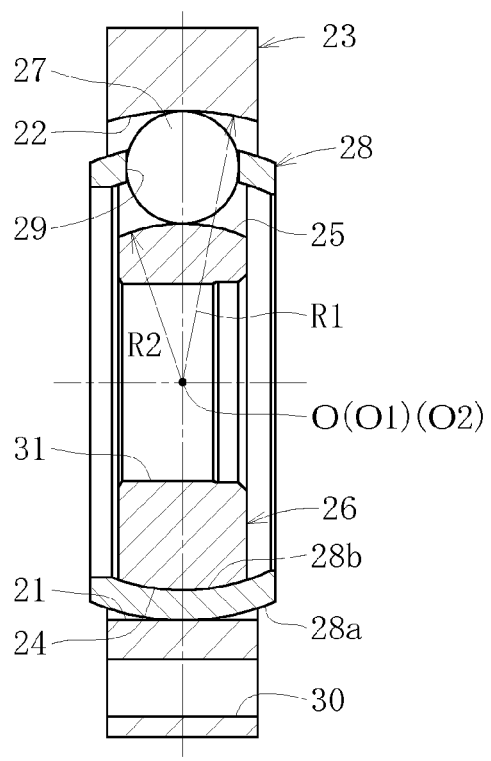
FIG. 2 is a sectional view taken along the line A-O-B of FIG. 1.

A fixed type constant velocity universal joint according to a first embodiment of the present invention includes, as illustrated in FIGS. 1 and 2: an outer race 23 having an inner surface 21 in which a plurality of (eight) track grooves 22 are formed along an axial direction, the outer race 23 serving as an outer joint member; an inner race 26 having an outer surface 24 in which a plurality of (eight) track grooves 25 are formed along the axial direction, the inner race 26 serving as an inner joint member; a plurality of (eight) torque transmitting balls 27 arranged in ball tracks formed of pairs of the track grooves 22 of the outer race 23 and the track grooves 25 of the inner race 26; and a cage 28 interposed between the inner surface of the outer race 23 and the outer surface of the inner race, for retaining the torque transmitting balls.

Figure 48:
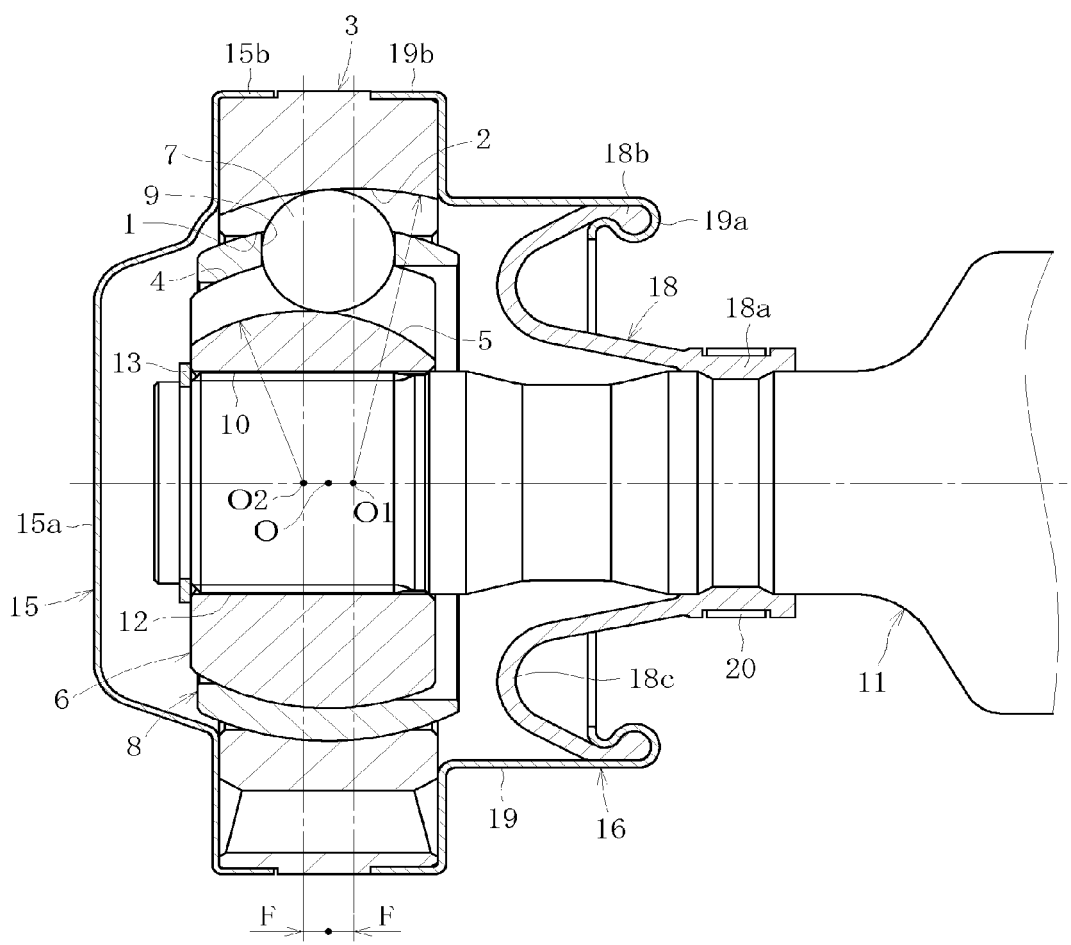
FIG. 48 is a sectional view of a conventional fixed type constant velocity universal joint.
Figure 49:
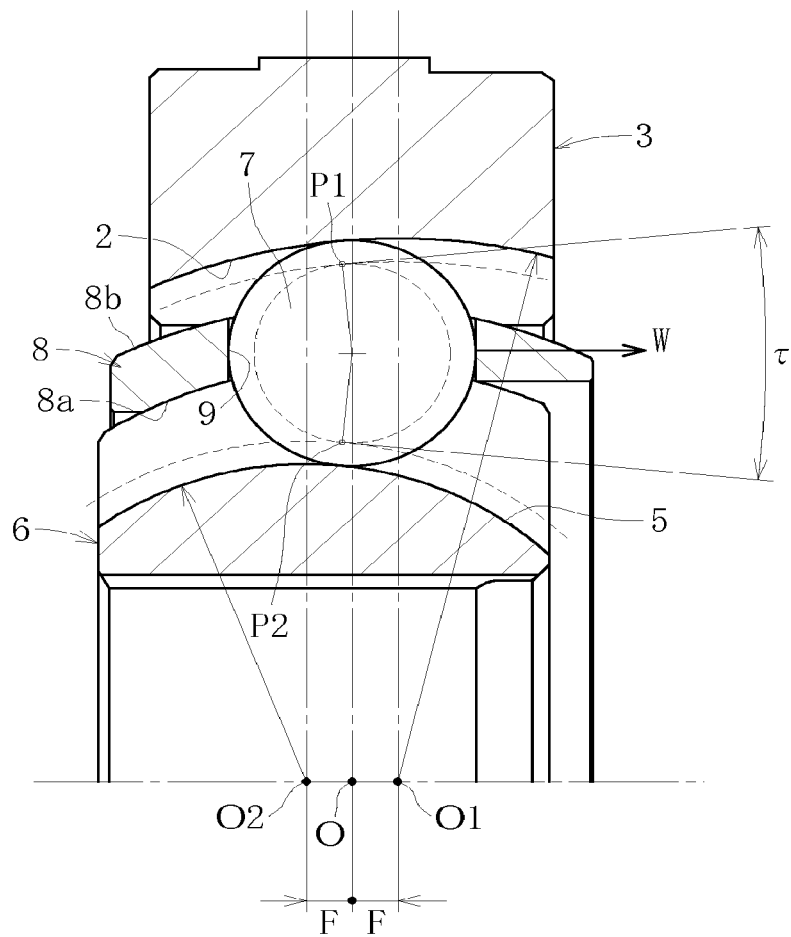
FIG. 49 is an enlarged sectional view of a main part of the fixed type constant velocity universal joint in FIG. 48.

Each of the track grooves 22 of the outer race 23 has a track groove bottom which is only formed of a circular arc portion, and a curvature center O1 thereof coincides with a joint center O. Further, each of the track grooves 25 of the inner race 26 has a track groove bottom which is only formed of a circular arc portion, and a curvature center O2 thereof coincides with the joint center O. That is, unlike a conventional fixed type constant velocity universal joint illustrated in FIG. 48, the track groove 22 of the outer race 23 and the track groove 25 of the inner race 26 are not offset in the axial direction.

Figure 3:
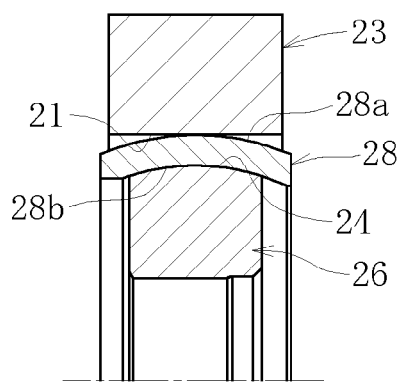
FIG. 3 is a sectional view of a main part of the fixed type constant velocity universal joint.
Figure 4:
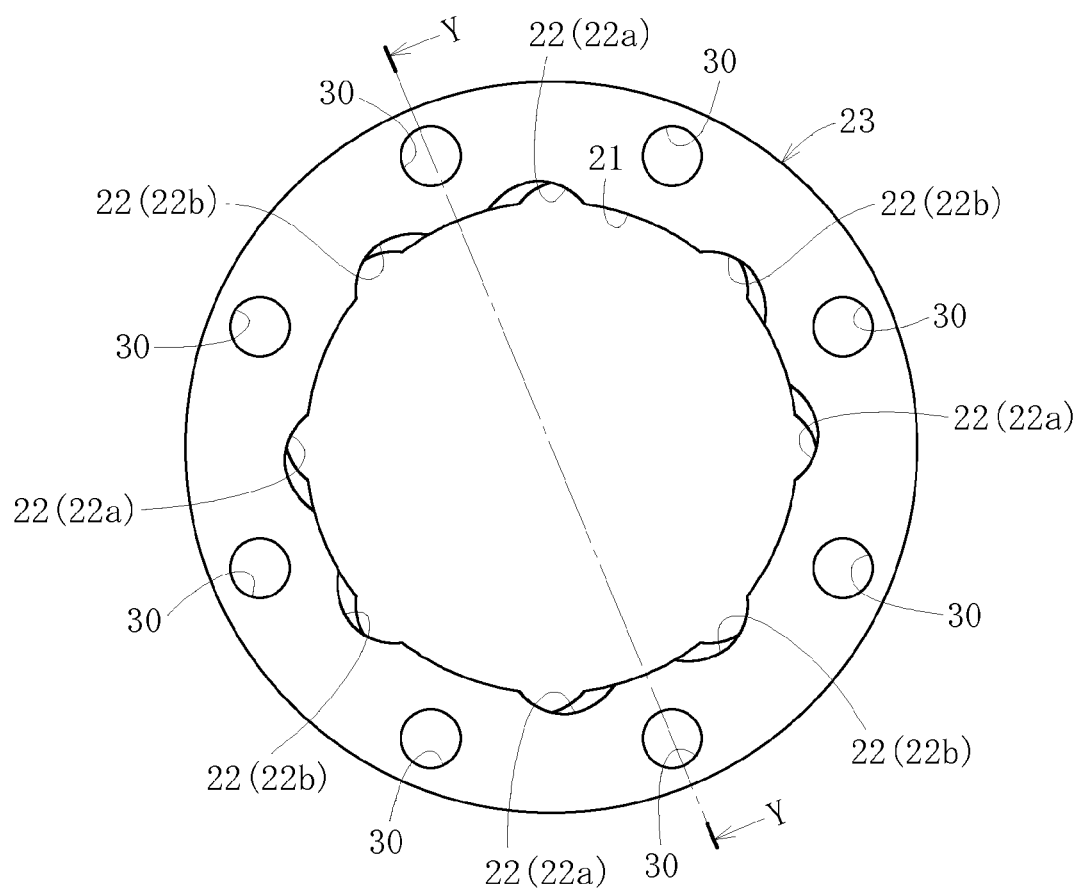
FIG. 4 is a front view of an outer race of the fixed type constant velocity universal joint.
Figure 5:
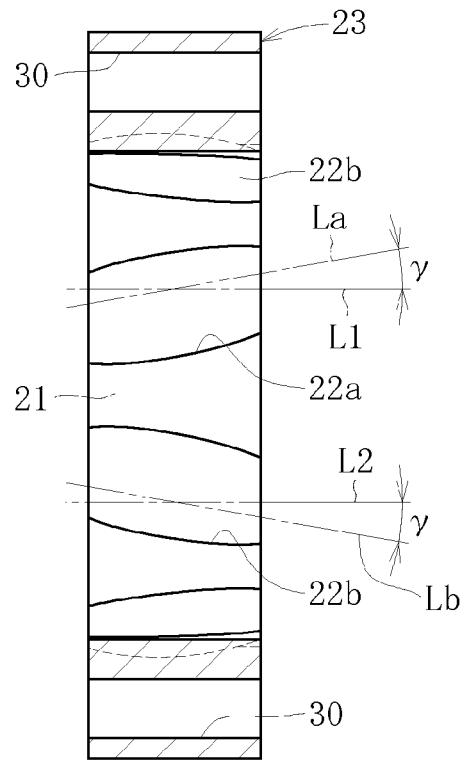
FIG. 5 is a sectional view taken along the line Y-Y of FIG. 4.
Figure 6:
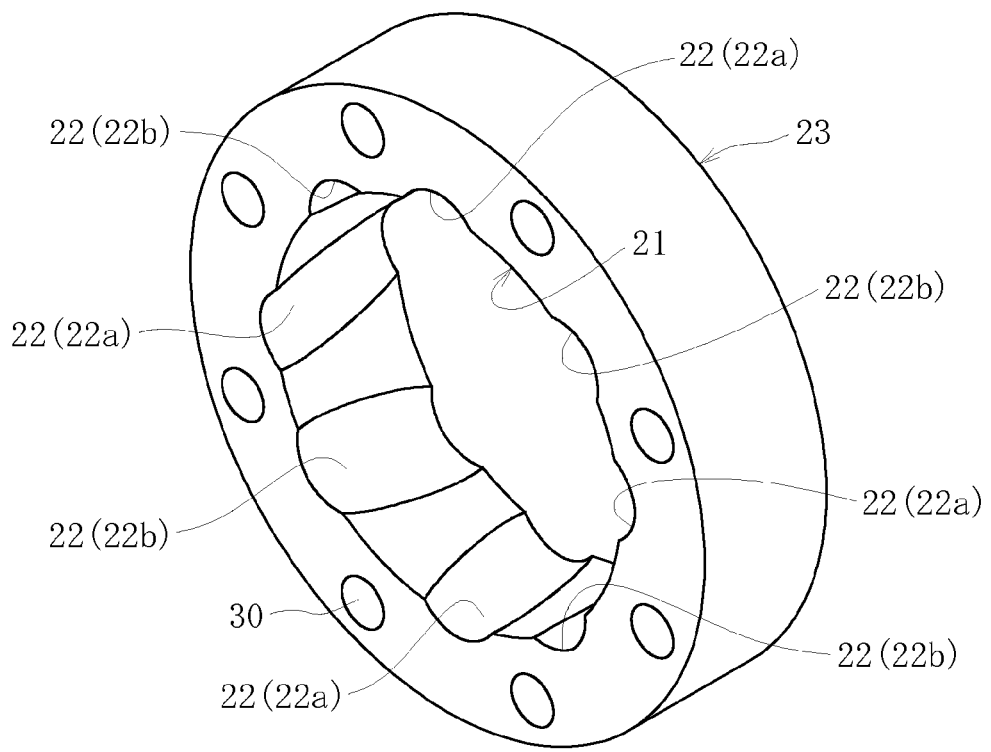
FIG. 6 is a perspective view of the outer race of the fixed type constant velocity universal joint.
Figure 7:
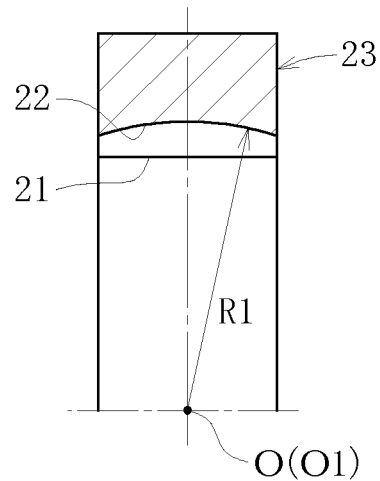
FIG. 7 is a sectional view of a main part of the outer race of the fixed type constant velocity universal joint.

Further, as illustrated in FIGS. 3 and 7, the inner surface 21 of the outer race 23 is formed of a cylindrical surface, and the track grooves 22 thereof include, as illustrated in FIGS. 4 to 6, track grooves 22a and 22b tilted in opposite directions from each other with respect to an axis line. That is, as illustrated in FIG. 5, an axis line La of the first track groove 22a is tilted by a predetermined angle γ with respect to a straight line L1 parallel to the joint axis line in a counterclockwise direction in FIG. 5. An axis line Lb of the second track groove 22b is tilted by the predetermined angle γ with respect to a straight line L2 parallel to the joint axis line in a clockwise direction in FIG. 5. Note that, the outer race 23 is provided with through holes 30 arranged at predetermined pitches along a circumferential direction. The through holes 30 are provided for, as in the conventional fixed type constant velocity universal joint, mounting an end cap or a flexible boot to the outer race 23.

Figure 8:
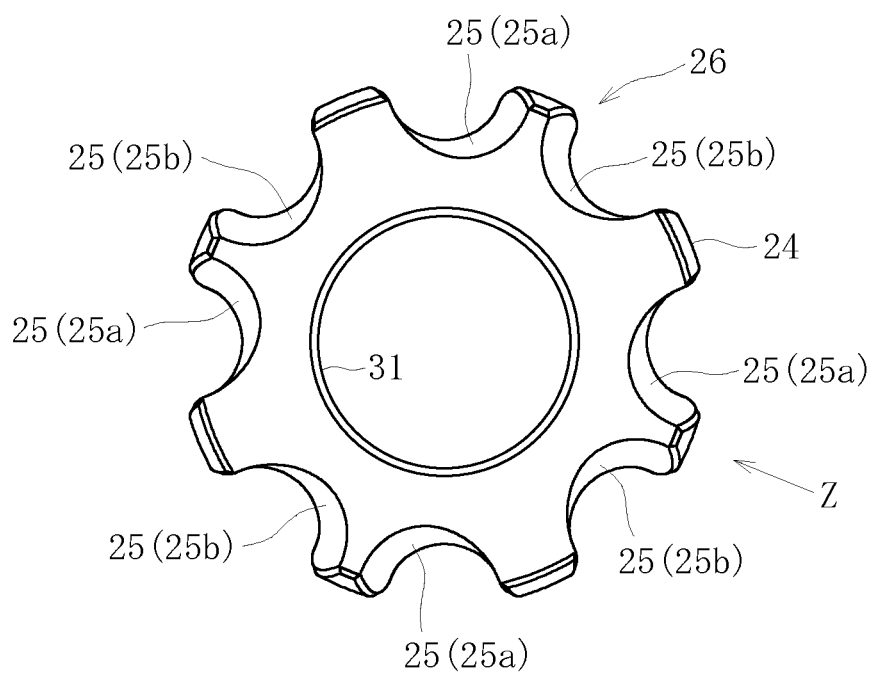
FIG. 8 is a front view of an inner race of the fixed type constant velocity universal joint.
Figure 9:
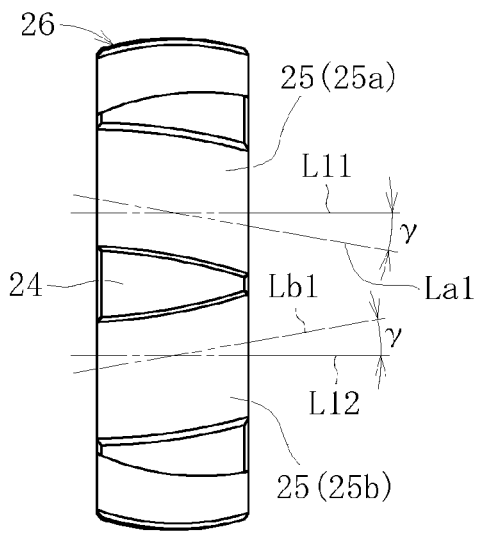
FIG. 9 is an arrow view in the Z direction of FIG. 8.
Figure 10:
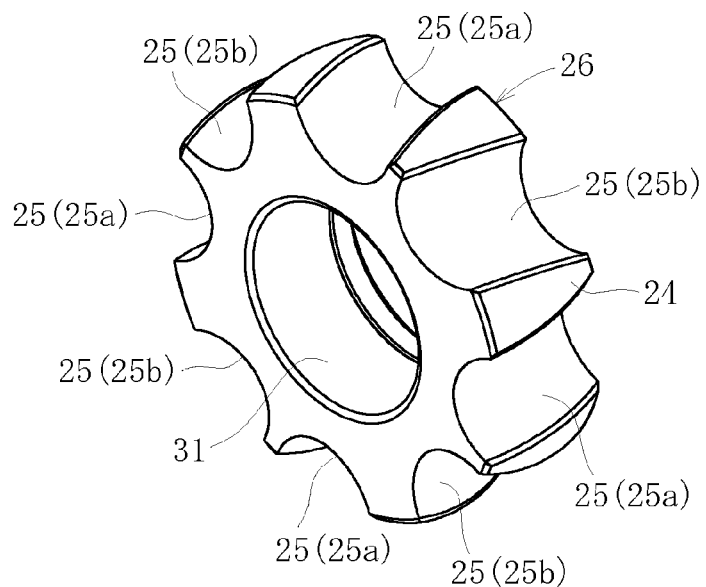
FIG. 10 is a perspective view of the inner race of the fixed type constant velocity universal joint.
Figure 11:
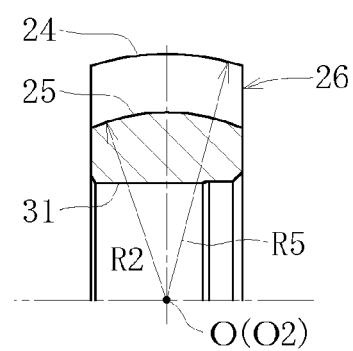
FIG. 11 is a sectional view of the inner race of the fixed type constant velocity universal joint.

The outer surface 24 of the inner race 26 is formed of a spherical surface, and the track grooves 25 thereof include, as illustrated in FIGS. 8 to 10, track grooves 25a and 25b tilted in opposite directions from each other with respect to the axis line. That is, as illustrated in FIG. 9, an axis line La1 of the first track groove 25a is tilted by the predetermined angle γ with respect to a straight line L11 parallel to the joint axis line in a clockwise direction in FIG. 9. An axis line Lb1 of the second track groove 25b is tilted by the predetermined angle γ with respect to a straight line L12 parallel to the joint axis line in a counterclockwise direction in FIG. 9. Note that, in the inner race 26, a shaft center hole 31 into which a shaft (not shown) is inserted is formed.

Figure 12:
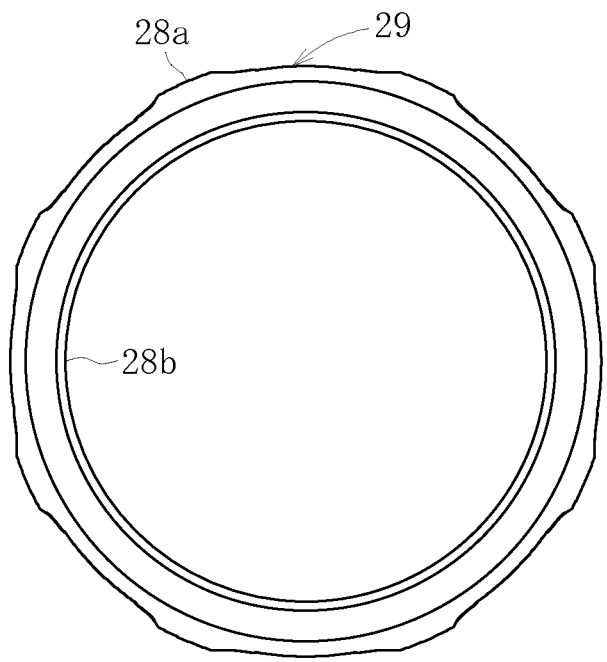
FIG. 12 is a front view of a cage of the fixed type constant velocity universal joint.
Figure 13:
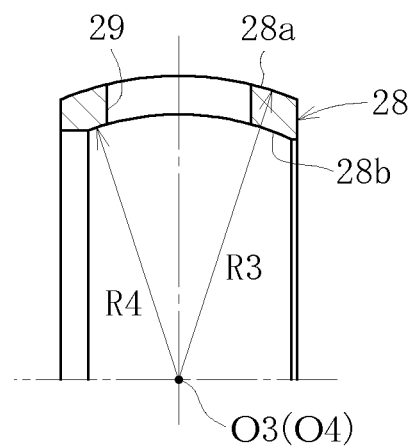
FIG. 13 is a sectional view of the cage of the fixed type constant velocity universal joint.
Figure 14:
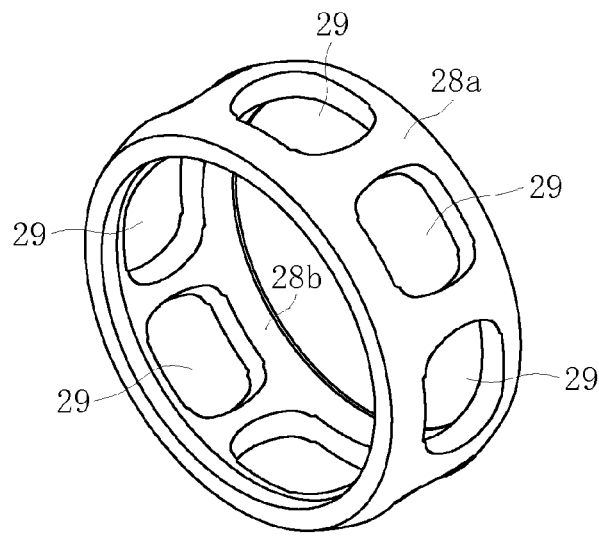
FIG. 14 is a perspective view of the cage of the fixed type constant velocity universal joint.

As illustrated in FIGS. 12 to 14, the cage 28 includes pockets 29 in a circumferential wall thereof, for retaining the balls 27 at predetermined pitches in the circumferential direction. In this case, an outer surface of the circumferential wall is referred to as an outer spherical surface 28a, and an inner surface of the circumferential wall is referred to as an inner spherical surface 28b.

A curvature center O3 of the outer spherical surface 28a coincides with a curvature center O4 of the inner spherical surface 28b. In this case, the curvature center O3 of the outer spherical surface 28a coincides with a curvature center of the inner surface of the outer race 23, and a curvature radius R3 of the outer spherical surface 28a is substantially the same as a radius of the inner surface of the outer race 23. Therefore, an axial intermediate portion of the outer spherical surface 28a is brought into contact with the inner surface of the outer race 23. Further, the curvature center O4 of the inner spherical surface 28b coincides with the curvature center of the outer surface 24 of the inner race 26, and a curvature radius R4 of the inner spherical surface 28b is substantially the same as a curvature radius R5 (see FIG. 11) of the outer surface 24 of the inner race 26. Therefore, the inner spherical surface 28b of the cage 28 is brought into sliding contact with the entire outer surface 24 of the inner race 26.

As described above, in the fixed type constant velocity universal joint of the present invention, the outer race 23 and the inner race 26 are formed so that the track grooves 22a and 22b and the track grooves 25a and 25b, which are respectively tilted in opposite directions from each other with respect to the axis line, are alternately formed in the circumferential direction. Therefore, as illustrated in FIG. 16, the track groove 22 of the outer race 23 and the track groove 25 of the inner race 26 are in a crossed state.

Figure 15:
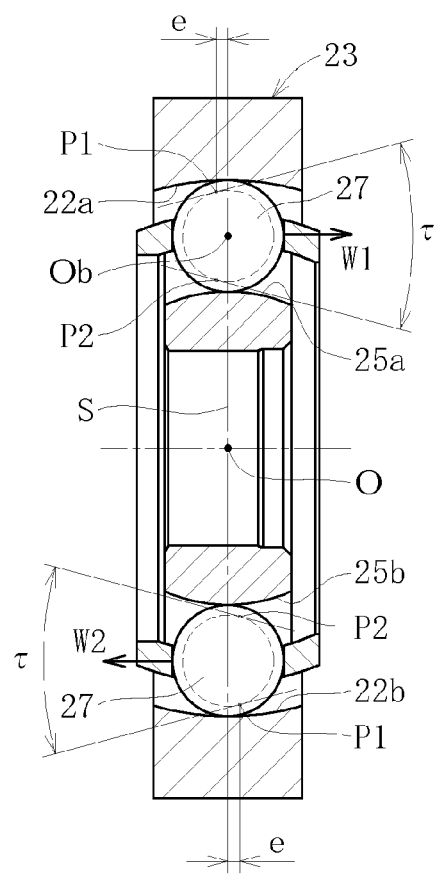
FIG. 15 is a sectional view of the fixed type constant velocity universal joint in a state in which torque load is applied.
Figure 16:
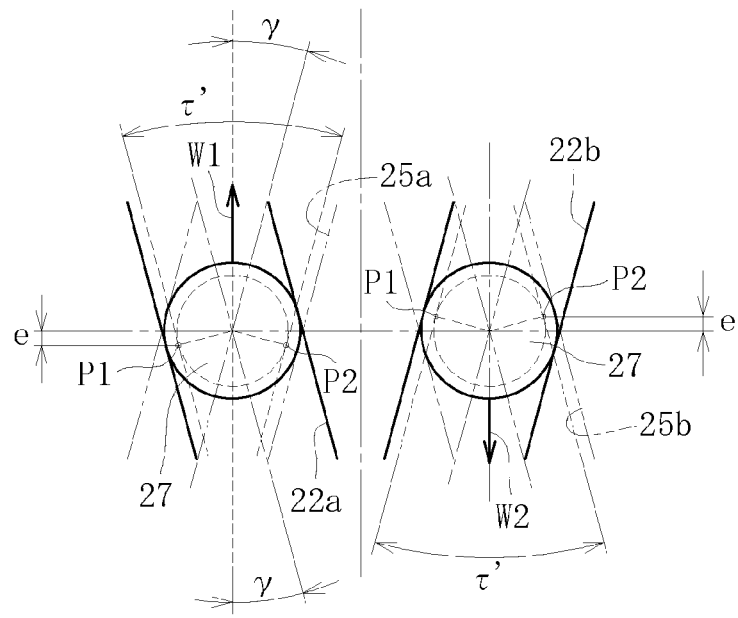
FIG. 16 is a schematic exploded view of the fixed type constant velocity universal joint in the state in which torque load is applied.

In FIG. 16, the solid lines indicate the track grooves 22 of the outer race 23, and the two-dot chain lines indicate the track grooves 25 of the inner race 26. Further, P1 represents a contact point of the ball 27 with respect to the track groove 22 of the outer race 23, and P2 represents a contact point of the ball 27 with respect to the track groove 25 of the inner race 26. In this case, as illustrated in FIG. 15, the contact points P1 and P2 of the first track grooves 22a and 25a are shifted by a predetermined amount e toward one opening side from a plane S passing the joint center O and a ball center Ob of the ball 27 under a state in which the operating angle is not formed. Further, the contact points P1 and P2 of the second track grooves 22b and 25b are shifted by the predetermined amount e toward another opening side from the plane S.

Therefore, owing to the intersecting angle γ, as illustrated in FIGS. 15 and 16, the balls 27 adjacent to each other in the circumferential direction form wedge angles τ in opposite directions from each other. That is, forces alternately act on adjacent pockets 29, and the wedge angles τ and τ' in opposite directions are alternately generated. Therefore, in the first track grooves 22a and 25a, a force W1 acts in a direction opposing to the contact points P1 and P2, and in the second track grooves 22b and 25b, a force W2 acts toward the contact points P1 and P2. Therefore, the cage position is stabilized at a median position of the inner and outer races.

According to this fixed type constant velocity universal joint, forces alternately act on adjacent pockets 29, and wedge angles in opposite directions are alternately generated, and hence the cage position is stabilized at a median position of the inner and outer races. Therefore, the spherical surface contact of the outer and inner spherical surfaces 28a and 28b of the cage is suppressed, and it is possible to smoothly operate the joint even when high load is applied or during high-speed rotation, prevent heat generation, and improve the durability.

Figure 50:
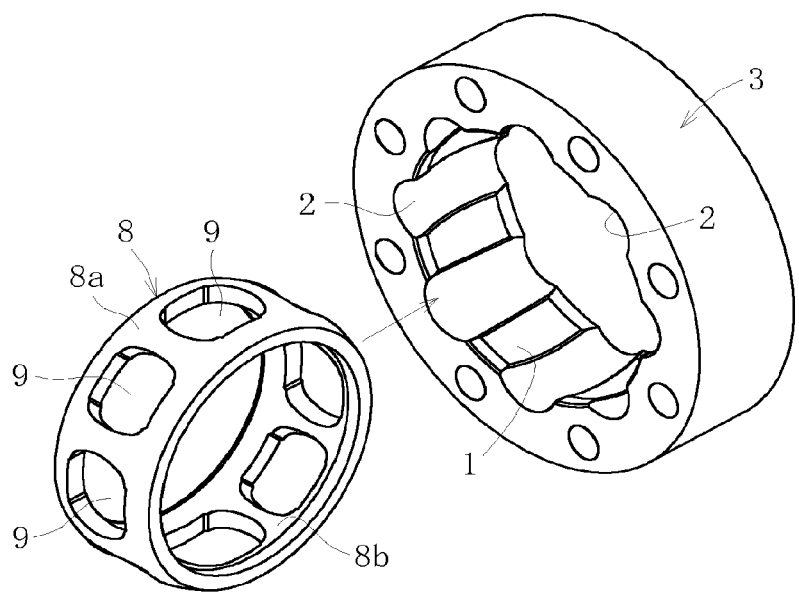
FIG. 50 is a perspective view illustrating a conventional method of inserting a cage into an outer race.

By the way, when the fixed type constant velocity universal joint is assembled, the cage 28 is required to be set in the outer race 23. However, in the conventional fixed type constant velocity universal joint, as illustrated in FIG. 50, the inner spherical surface 1 of the outer race 3 has a spherical surface shape, and also an outer surface 8a and an inner surface 8b of the cage 8 has the spherical surface shape. Therefore, when the cage 8 is set in the outer race 3, as illustrated in FIG. 50, the cage 8 is required to be inserted into the outer race 3 under a state in which an axial center of the cage 8 and an axial center of the outer race 3 are orthogonal to each other. That is, the holes of the pockets 9 of the cage 8 are used. Therefore, in the setting operation, it is necessary to perform phase alignment, which causes difficulty in the setting operation.

Figure 17:
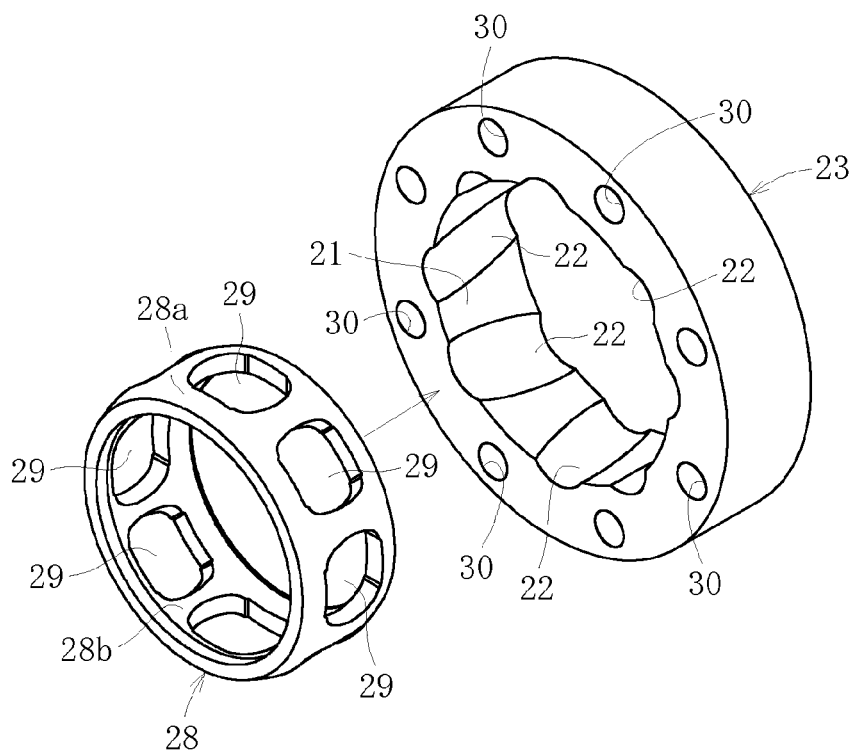
FIG. 17 is a perspective view illustrating a method of inserting the cage into the outer race.

However, as in the present invention, when the inner surface 21 of the outer race 23 is a cylindrical surface, in the case where the cage 28 is set in the outer race 23, as illustrated in FIG. 17, insertion may be performed under a state in which an axial center of the outer race 23 coincides with an axial center of the cage 28 as indicated by the arrow. At this time, the insertion may be performed without considering the positional relationship between the track groove of the outer race 23 and the pocket 29 of the cage 28, and hence the setting operation can be facilitated.

Further, in this constant velocity universal joint, as illustrated in FIG. 3, the outer spherical surface 28a of the cage 28 has little contact with the inner surface 21 of the outer race 23. Therefore, circulation of a lubricant agent is promoted, heat generation is prevented, and durability is improved. Further, it is unnecessary to perform finish working (grinding or hardened steel cutting) to the inner surface 21 of the outer race 23 and the outer spherical surface 28a of the cage 28. That is, the forged surfaces of the inner surface 21 of the outer race 23 and the outer spherical surface 28a of the cage 28 are not required to be processed. As described above, the finish working can be omitted, and hence cost reduction and improvement in productivity can be achieved. Note that, the track grooves 22 and 25 may be subjected to forge finishing, or mechanical working, that is, finish working (grinding or hardened steel cutting).

Figure 18:
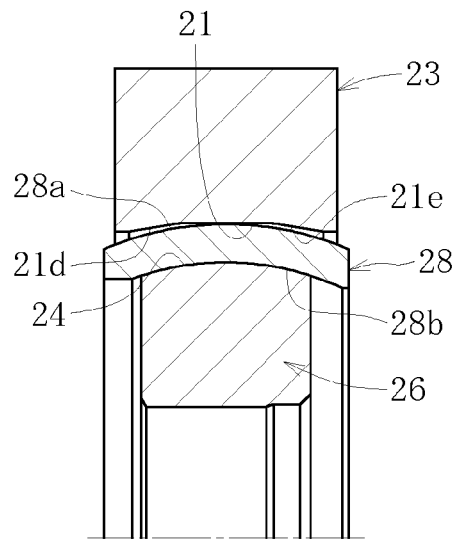
FIG. 18 is a sectional view of a main part of a fixed type constant velocity universal joint using an outer race of a first modified example.
Figure 19:
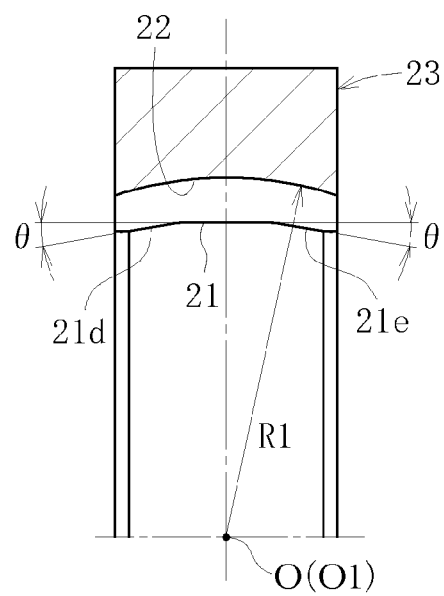
FIG. 19 is a sectional view of a main part of the outer race of the fixed type constant velocity universal joint in FIG. 18.

Next, FIG. 18 illustrates a fixed type constant velocity universal joint using an outer race 23 of a first modified example. The outer race 23 in this case is obtained by adding, to the outer race 23 illustrated in FIG. 1, etc. (the outer race having the inner surface 21 with a cylindrical surface), tapered portions 21d and 21e provided at both opening portions and tapered toward each of the opening sides.

A taper angle θ (see FIG. 19) of the tapered portions 21d and 21e is set so that, when setting is performed as illustrated in FIG. 18, the tapered portions 21d and 21e are not brought into contact with the outer spherical surface 28a of the cage 28. Therefore, the outer spherical surface 28a of the cage 28 has little contact with the inner surface 21 of the outer race 23.

Thus, even with such a fixed type constant velocity universal joint, actions and effects similar to those of the fixed type constant velocity universal joint illustrated in FIG. 1, etc. can be produced.

Figure 20:
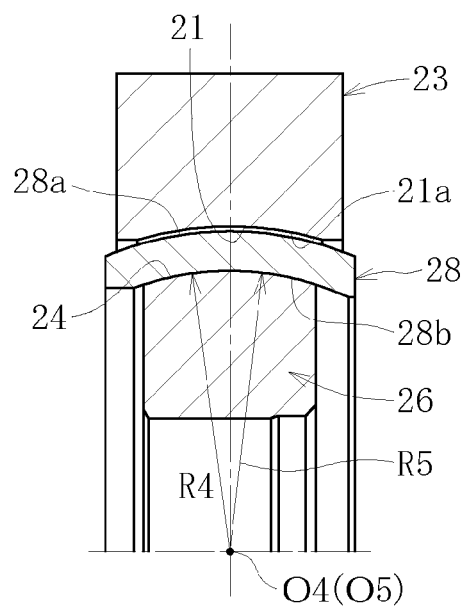
FIG. 20 is a sectional view of a main part of a fixed type constant velocity universal joint using an outer race of a second modified example.
Figure 21:
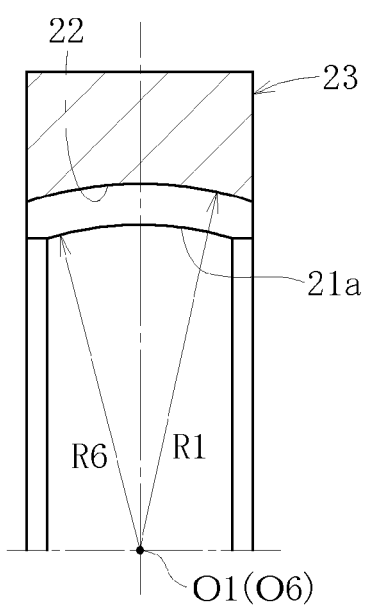
FIG. 21 is a sectional view of a main part of the outer race of the fixed type constant velocity universal joint in FIG. 20.

Further, FIG. 20 illustrates the fixed type constant velocity universal joint using the outer race 23 of the first modified example. The inner surface 21 of the outer race 23 is a spherical surface 21a which forms a gap together with the outer spherical surface 28a of the cage 28. In this case, as illustrated in FIG. 21, a curvature center O6 of the spherical surface 21a coincides with the curvature center O1 of the track groove 22.

The inner race 26 of the fixed type constant velocity universal joint using this outer race 23 is configured so that a curvature center O5 of the outer surface 24 thereof coincides with the curvature center O4 of the inner spherical surface 28b of the cage 28, and a curvature radius R5 of the outer surface 24 substantially coincides with the curvature radius R4 of the inner spherical surface 28b. With this, the inner spherical surface 28b of the cage 28 and the outer surface 24 of the inner race 26 are brought into sliding contact with each other.

Figure 22:
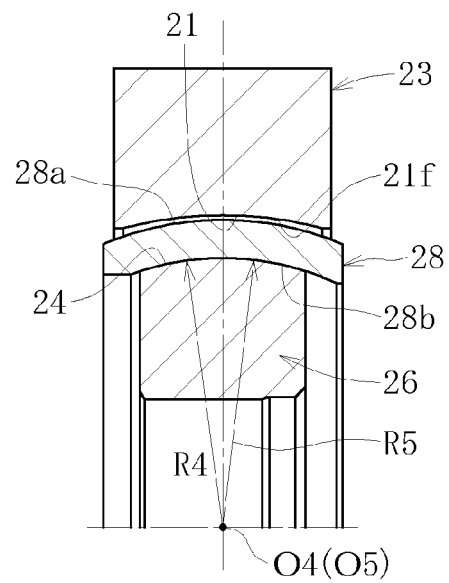
FIG. 22 is a sectional view of a main part of a fixed type constant velocity universal joint using an outer race of a third modified example.
Figure 23:
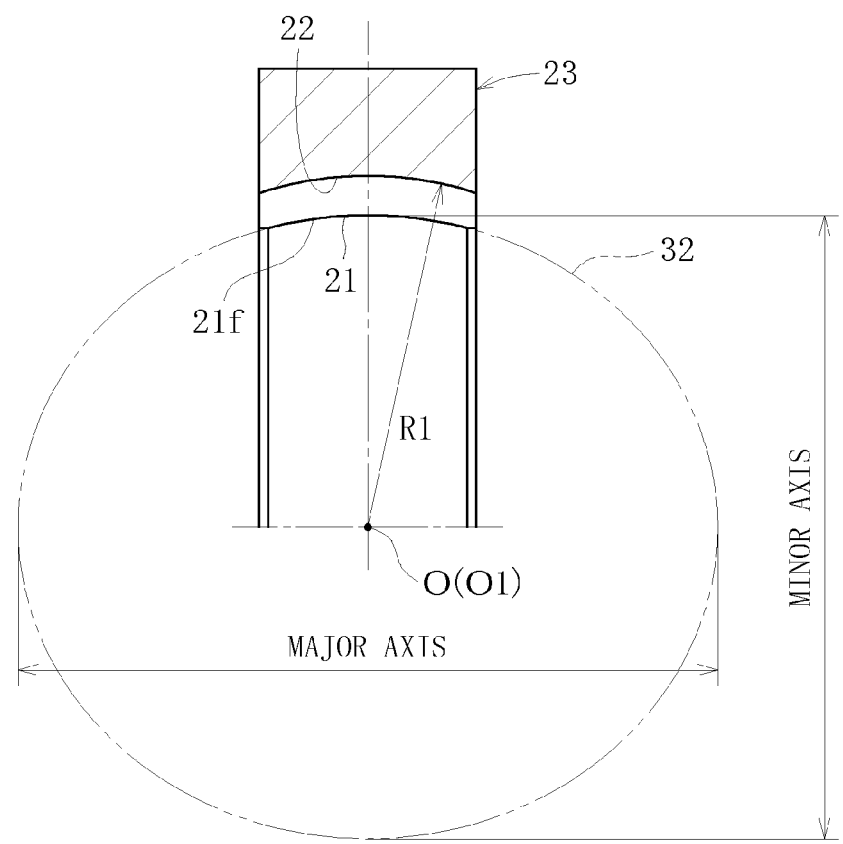
FIG. 23 is a sectional view of a main part of the outer race of the fixed type constant velocity universal joint in FIG. 22.

Next, FIG. 22 illustrates a fixed type constant velocity universal joint using an outer race 23 of a second modified example. The inner surface 21 of the outer race 23 in this case is an elliptical surface 21f which forms a gap together with the outer spherical surface 28a of the cage 28. That is, the elliptical surface 21f is formed along an oval sphere surface of an ellipse 32 indicated by the two-dot chain line in FIG. 23.

The inner race 26 of the fixed type constant velocity universal joint using this outer race 23 is configured so that a curvature center O5 of the outer surface 24 thereof coincides with the curvature center O4 of the inner spherical surface 28b of the cage 28, and the curvature radius R5 of the outer surface 24 substantially coincides with the curvature radius R4 of the inner spherical surface 28b. With this, the inner spherical surface 28b of the cage 28 and the outer surface 24 of the inner race 26 are brought into sliding contact with each other.

As described above, the gap is formed between the inner surface 21 of the outer race 23 and the outer spherical surface 28a of the cage 28. In this manner, the circulation of the lubricant agent is promoted, the heat generation is prevented, and the durability is improved. Further, the inner spherical surface 28b of the cage 28 and the outer surface 24 of the inner race 26 are brought into sliding contact with each other. Therefore, the cage position is determined, and even in the case where there is no restriction of the cage 28 by the outer race 23, the function as the fixed type constant velocity universal joint can be stably exerted.

Figure 24:
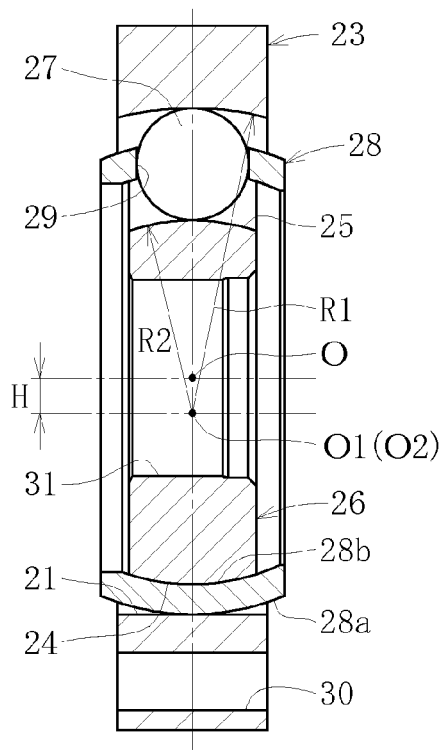
FIG. 24 is a front view of a fixed type constant velocity universal joint, illustrating a second embodiment of the present invention.
Figure 25:
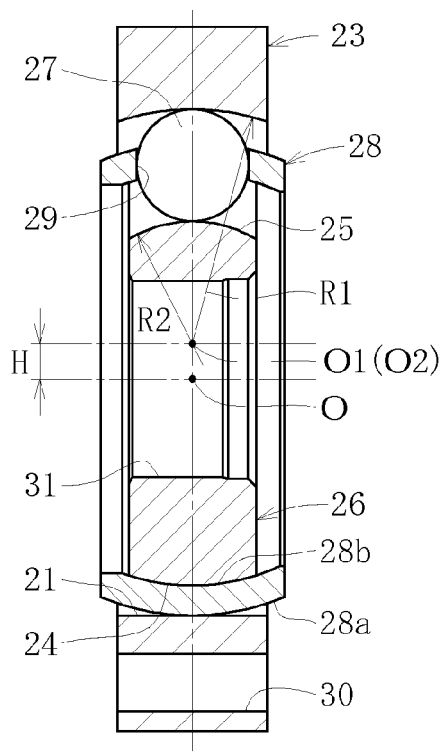
FIG. 25 is a front view of a fixed type constant velocity universal joint, illustrating a third embodiment of the present invention.

Next, in FIGS. 24 and 25, the curvature center O1 of the track groove 22 of the outer race 23 and the curvature center O2 of the track groove 25 of the inner joint member are shifted from the joint center O in the radial direction. In FIG. 24, the curvature centers O1 and O2 are shifted by an offset amount H with respect to the joint center O at positions more widely spaced apart from the track groove than the joint center O. Further, in FIG. 25, the curvature centers O1 and O2 are shifted by the offset amount H with respect to the joint center O at positions more approaching the track groove than the joint center O.

Figure 26:
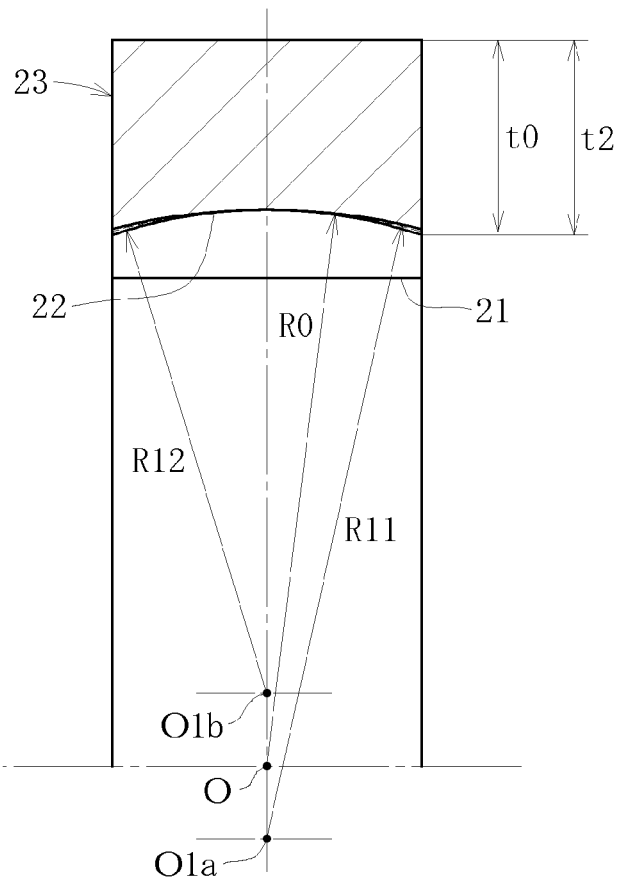
FIG. 26 is a sectional view of the outer race under a state in which a curvature center of a track groove is offset in a radial direction.
Figure 27:
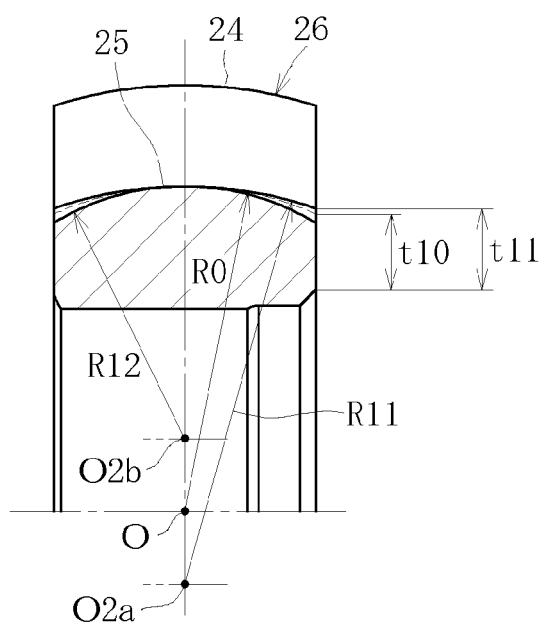
FIG. 27 is a sectional view of the inner race under a state in which a curvature center of a track groove is offset in a radial direction.

FIG. 26 illustrates a case where the curvature center O1 of the outer race 23 is arranged at a position more widely spaced apart from the track groove than the joint center O, and a case where the curvature center O1 thereof is arranged at a position more approaching the track groove than the joint center O. In FIG. 26, O1a represents the curvature center of the track groove 22 of the outer race 23, which is arranged at a position more widely spaced apart from the track groove than the joint center O, and O1b represents the curvature center of the track groove 22 of the outer race 23, which is arranged at a position more approaching the track groove than the joint center O. Further, FIG. 27 illustrates a case where the curvature center O2 of the inner race 26 is arranged at a position more widely spaced apart from the track groove than the joint center O, and a case where the curvature center O2 is arranged at a position more approaching the track groove than the joint center O. In FIG. 27, O2a represents the curvature center of the track groove 25 of the inner race 26, which is arranged at a position more widely spaced apart from the track groove than the joint center O, and O2b represents the curvature center of the track groove 25 of the inner race 26, which is arranged at a position more approaching the track groove than the joint center O.

When the curvature centers O1 and O2 of the track grooves 22 and 25 of the outer race 23 and the inner race 26 are displaced in a direction more widely spaced apart from the track groove than the joint center O, the track groove 22 of the outer race 23 can be taken large. Thus, a load capacity thereof can be increased, and a thickness of an axial end opening portion of the track groove 25 of the inner race 26 can be increased, to thereby enable stable connection of the shaft to be fitted into the hole portion of the inner race 26. Further, when the curvature centers O1 and O2 of the track grooves 22 and 25 of the outer race 23 and the inner race 26 are displaced in a direction more approaching the track groove than the joint center O, a load capacity of the track groove 25 of the inner race 26 can be increased and the thickness of the outer race 23 can be increased. Thus, the strength is stabilized.

Note that, in FIG. 26, t0 represents a thickness of the outer race at an axial end portion of the track groove 22 when the curvature center O1 of the track groove 22 coincides with the joint center O, and t2 represents a thickness of the outer race at the axial end portion of the track groove 22 when the curvature center O1 of the track groove 22 is displaced in a direction more approaching the track groove than the joint center O. Further, in FIG. 27, t10 represents a thickness of the inner race at an axial end portion of the track groove 25 when the curvature center O2 of the track groove 25 coincides with the joint center O, and t11 represents a thickness of the inner race at the axial end portion of the track groove 25 when the curvature center O2 of the track groove 25 is more widely spaced apart from the track groove than the joint center O.

Figure 28:
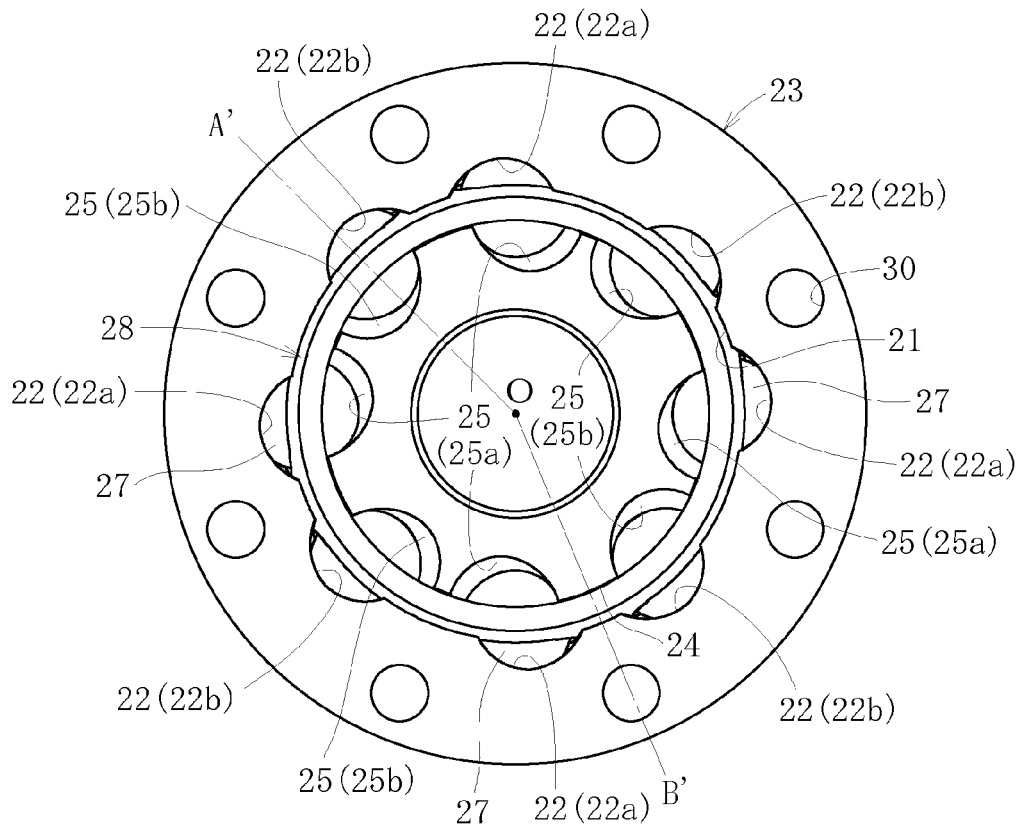
FIG. 28 is a front view of a fixed type constant velocity universal joint, illustrating a fourth embodiment of the present invention.
Figure 29:
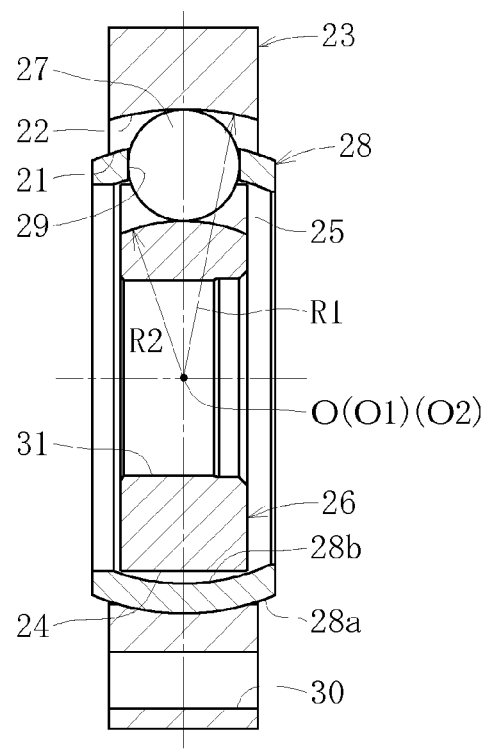
FIG. 29 is a sectional view taken along the line A'-O-B' of FIG. 28.
Figure 30:
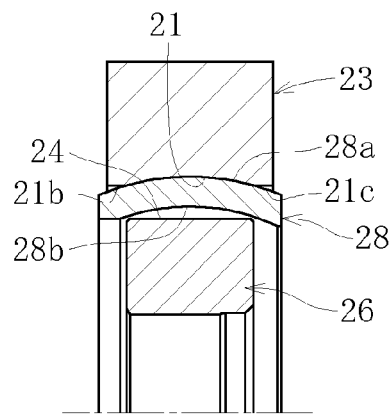
FIG. 30 is an enlarged sectional view of a main part of the fixed type constant velocity universal joint in FIG. 28.
Figure 32:
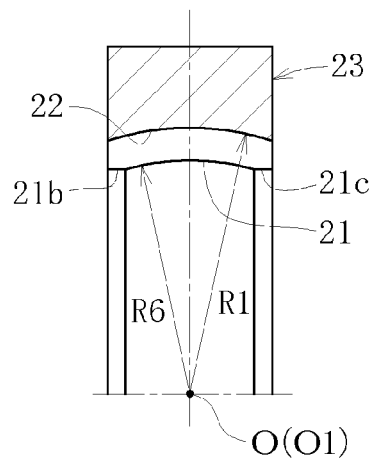
FIG. 32 is a sectional view of the outer race of the fixed type constant velocity universal joint in FIG. 28.
Figure 36:
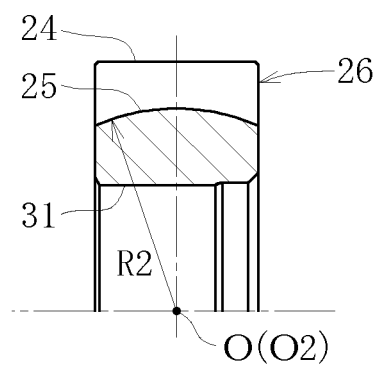
FIG. 36 is a sectional view of the inner race of the fixed type constant velocity universal joint in FIG. 28.

Next, in the fixed type constant velocity universal joint illustrated in FIGS. 28 and 29, the inner surface 21 of the outer race 23 is a spherical surface, and as illustrated in FIG. 36, the outer surface 24 of the inner race 26 is a cylindrical surface. Therefore, as illustrated in FIG. 30, a gap is formed between the outer surface 24 of the inner race 26 and the inner spherical surface 28b of the cage 28. Further, the curvature center of the inner surface 21 of the outer race 23 coincides with the curvature center O1 of the track groove 22 of the outer race 23. Note that, as illustrated in FIG. 32, cutout portions 21b and 21c are provided at both axial end portions of the inner surface 21 of the outer race 23.

Figure 31:
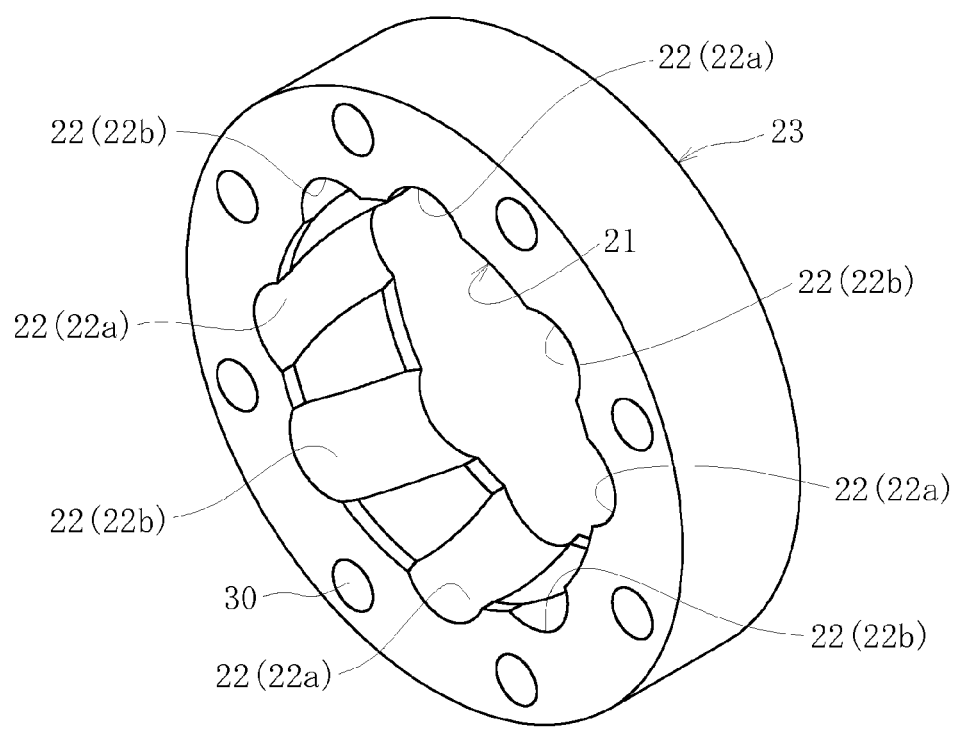
FIG. 31 is a perspective view of an outer race of the fixed type constant velocity universal joint in FIG. 28.
Figure 33:
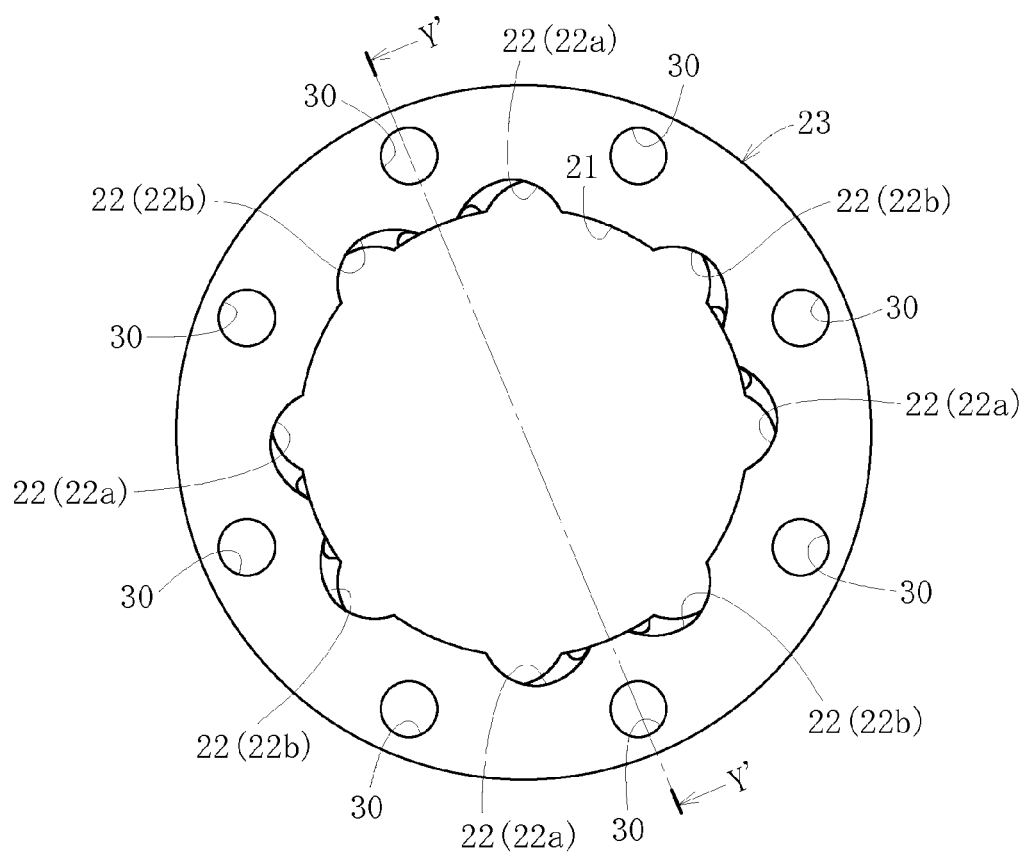
FIG. 33 is a front view of the outer race of the fixed type constant velocity universal joint in FIG. 28.
Figure 34:
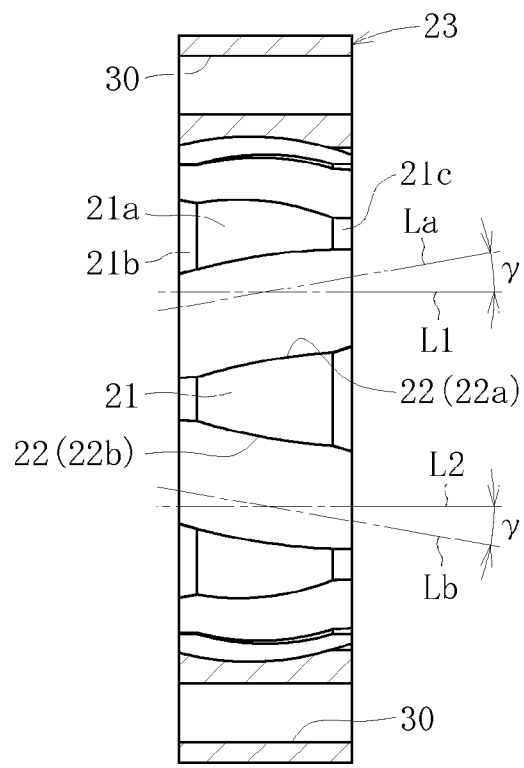
FIG. 34 is a sectional view taken along the line Y'-Y' of FIG. 33.

Further, also in this case, as illustrated in FIGS. 31, 33, and 34, the track grooves 22 include track grooves 22a and 22b that are tilted in opposite directions from each other with respect to the axis line. That is, as illustrated in FIG. 34, the axis line La of the first track groove 22a is tilted by the predetermined angle γ with respect to the straight line L1 parallel to the joint axis line in the counterclockwise direction of FIG. 34. The axis line Lb of the second track groove 22b is tilted by the predetermined angle γ with respect to the straight line L2 parallel to the joint axis line in the clockwise direction of FIG. 34.

Figure 35:
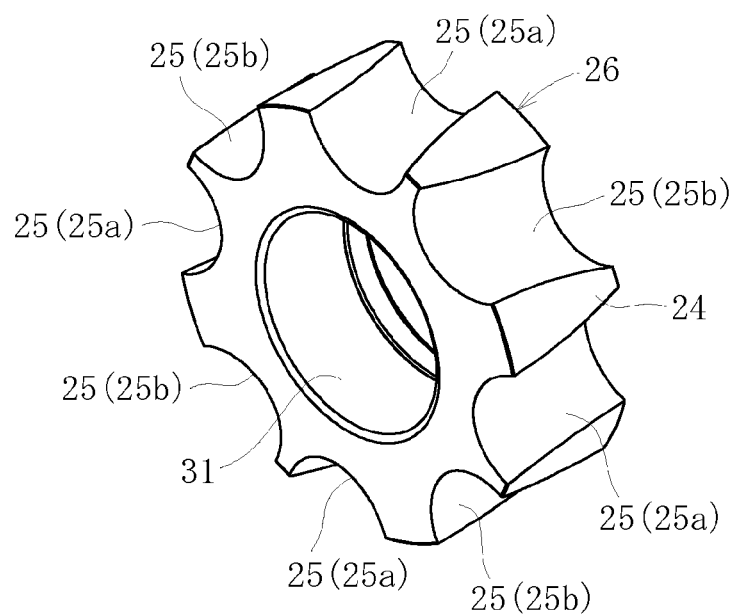
FIG. 35 is a perspective view of an inner race of the fixed type constant velocity universal joint in FIG. 28.
Figure 37:
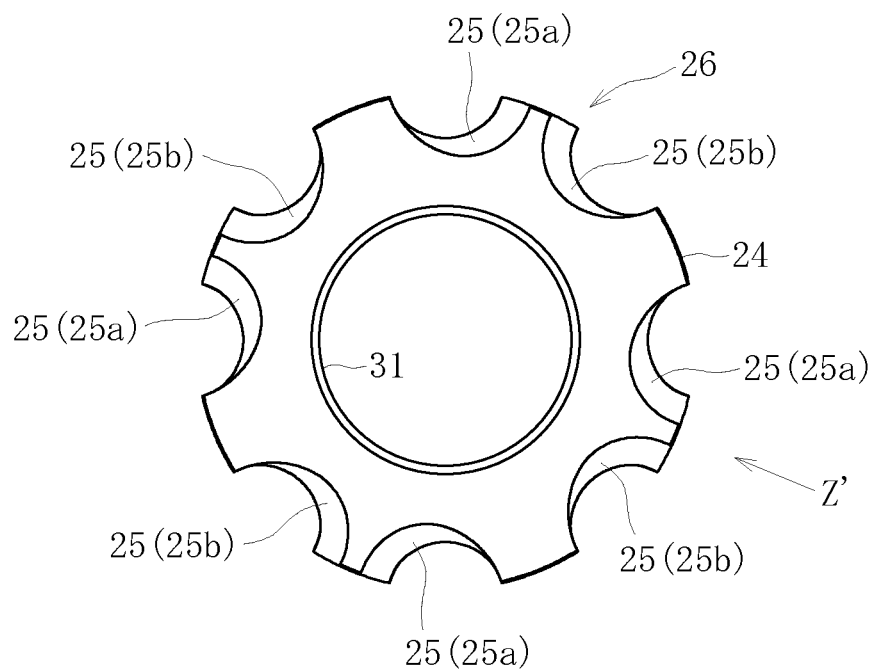
FIG. 37 is a front view of the inner race of the fixed type constant velocity universal joint in FIG. 28.
Figure 38:
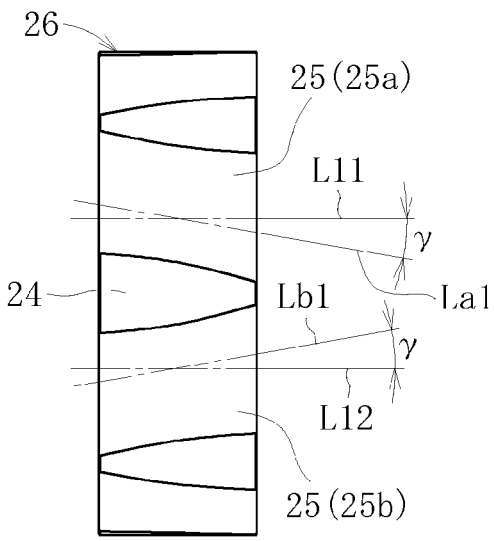
FIG. 38 is an An arrow view in the Z' direction of FIG. 37.

Further, as illustrated in FIGS. 35, 37, and 38, the track grooves 25 of the inner race 26 include track grooves 25a and 25b that are tilted in opposite directions from each other with respect to the axis line. That is, as illustrated in FIG. 38, the axis line La1 of the first track groove 25a is tilted by the predetermined angle γ with respect to the straight line L11 parallel to the joint axis line in the clockwise direction of FIG. 38. The axis line Lb1 of the second track groove 25b is tilted by the predetermined angle γ with respect to the straight line L12 parallel to the joint axis line in the counterclockwise direction of FIG. 38. Note that, in the inner race 26, the shaft center hole 31 into which the shaft (not shown) is fitted is formed.

Therefore, the track grooves 22a and 22b of the outer race 23 and the track grooves 25a and 25b of the inner race 26 have a relationship as illustrated in FIGS. 15 and 16. As described above, also in the case of the fixed type constant velocity universal joint which includes the inner race 26 having the outer surface 24 being a cylindrical surface, similarly to the fixed type constant velocity universal joint which includes the outer race 23 having the inner surface being a cylindrical surface, it is possible to produce the actions and effects that "the cage position is stabilized at a median position of the inner and outer races. Therefore, the spherical surface contact of the outer and inner spherical surfaces of the cage is suppressed, and it is possible to smoothly operate the joint even when high load is applied or during high-speed rotation, prevent heat generation, and improve the durability."

Figure 51:
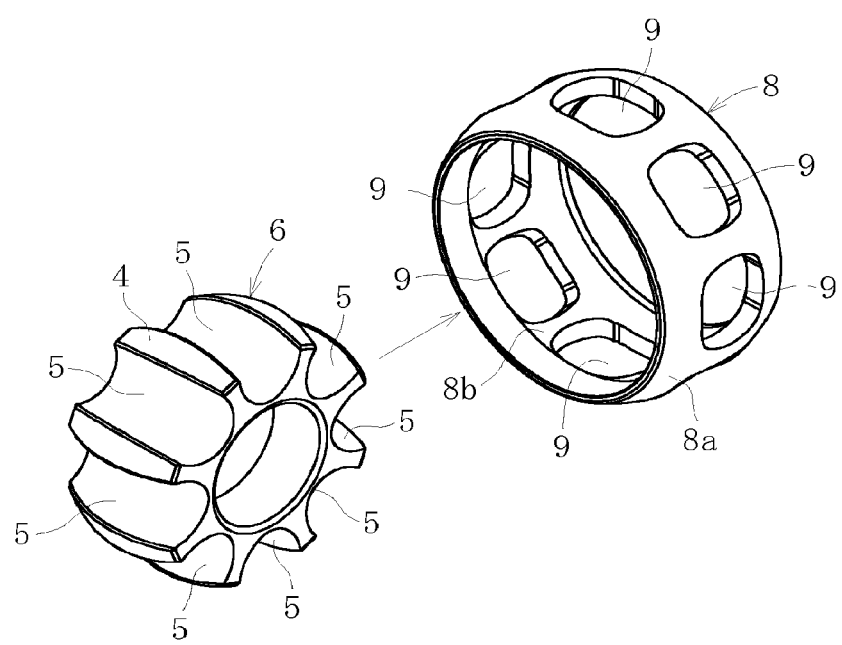
FIG. 51 is a perspective view illustrating a conventional method of inserting an inner race into a cage.

By the way, when the fixed type constant velocity universal joint is assembled, the inner race 26 is required to be set in the cage 28. However, in the conventional fixed type constant velocity universal joint, as illustrated in FIG. 51, the outer spherical surface 4 of the inner race 6 has a spherical surface shape, and also an inner surface of the cage 8 has the spherical surface shape. Therefore, when the inner race 6 is set in the cage 8, the inner race 6 is required to be inserted into the cage 8 under a state in which the axial center of the cage 8 and the axial center of the inner race 6 are orthogonal to each other. That is, the recesses of the track grooves 5 of the inner race 6 are used. Therefore, in the setting operation, it is necessary to perform phase alignment, which causes difficulty in the setting operation.

Figure 39:
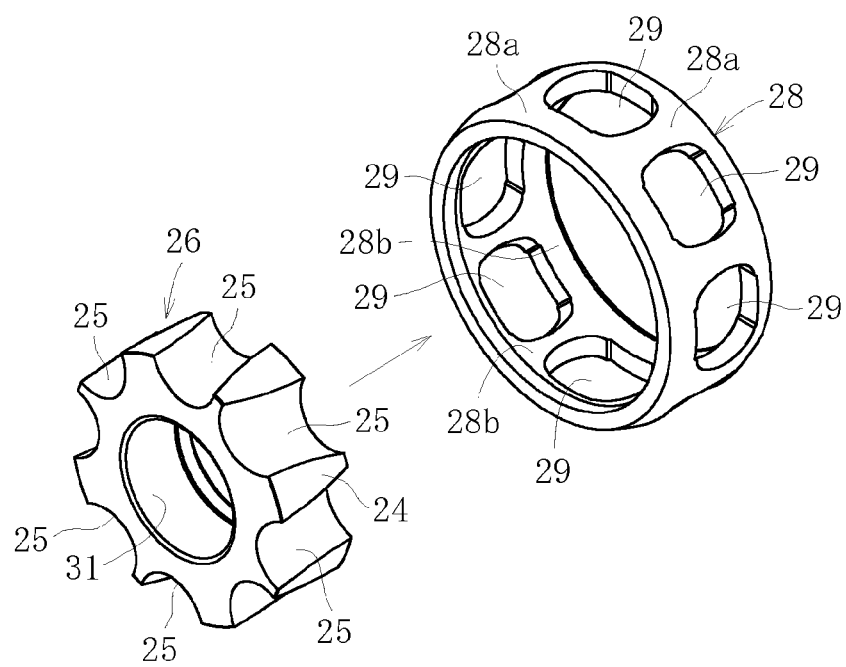
FIG. 39 is a perspective view illustrating a method of inserting the inner race into the cage.

However, as in the present invention, when the outer surface 24 of the inner race 26 is a cylindrical surface, in the case where the inner race 26 is set in the cage 28, as illustrated in FIG. 39, insertion may be performed under a state in which an axial center of the inner race 26 coincides with the axial center of the cage 28 as indicated by the arrow. At this time, the insertion may be performed without considering the positional relationship between the track groove 25 of the inner race 26 and the pocket 29 of the cage 28, and hence the setting operation can be facilitated.

As described above, the outer surface 24 of the inner race 26 is a cylindrical surface, and hence the setting property of the inner race 26 into the cage 28 and workability of the inner race 26 can be improved. Further, the inner spherical surface 28b of the cage 28 is a concave spherical surface, and hence the outer surface 24 of the inner race 26 and the inner spherical surface 28b of the cage 28 have little contact with each other. Therefore, lubrication by a lubricant agent is promoted, heat generation is prevented, and durability is improved.

The inner surface 21 of the outer race 23 is a spherical surface which is to be brought into sliding contact with the outer spherical surface 28a of the cage 28. In this manner, the cage position is determined. Therefore, even in the case where there is no restriction of the cage 28 by the inner race 26, the function as the fixed type constant velocity universal joint can be stably exerted.

Further, in this constant velocity universal joint, as illustrated in FIG. 30, the inner spherical surface 28b of the cage 28 has little contact with the outer surface 21 of the inner race 26. Therefore, circulation of a lubricant agent is promoted, heat generation is prevented, and durability is improved. Further, it is unnecessary to perform finish working (grinding or hardened steel cutting) to the outer surface 24 of the inner race 26 and the inner spherical surface 28b of the cage 28. That is, the forged surfaces of the outer surface 24 of the inner race 26 and the inner spherical surface 28b of the cage 28 are not required to be processed. As described above, the finish working can be omitted, and hence cost reduction and improvement in productivity can be achieved. Note that, the track grooves 22 and 25 may be subjected to forge finishing, or mechanical working, that is, finish working (grinding or hardened steel cutting).

Figure 40:
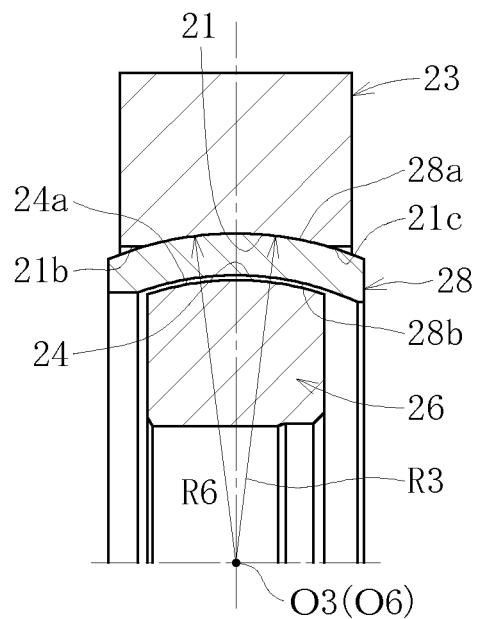
FIG. 40 is a sectional view of a main part of a fixed type constant velocity universal joint using an inner race of a first modified example.
Figure 41:
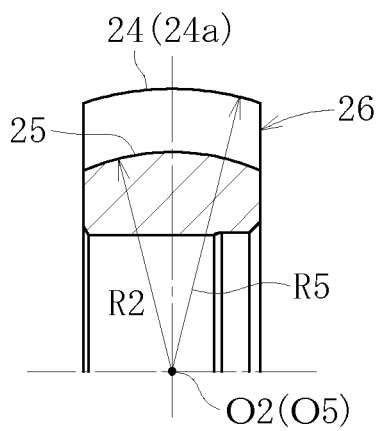
FIG. 41 is a sectional view of the inner race of the fixed type constant velocity universal joint in FIG. 40.

FIG. 40 illustrates a fixed type constant velocity universal joint using an inner race 26 of a first modified example. The outer surface 24 of the inner race 26 is a spherical surface 24a which forms a gap together with the inner spherical surface 28b of the cage 28. In this case, as illustrated in FIG. 41, the curvature center O5 of the spherical surface 24a coincides with the curvature center O2 of the track groove 25.

The outer race 23 of the fixed type constant velocity universal joint using this inner race 26 is configured so that, as illustrated in FIG. 40, the curvature center O6 of the inner surface 21 thereof coincides with the curvature center O3 of the outer spherical surface 28a of the cage 28, and a curvature radius R6 of the inner surface 21 substantially coincides with the curvature radius R3 of the outer spherical surface 28a. With this, the outer spherical surface 28a of the cage 28 and the inner surface 21 of the outer race 23 are brought into sliding contact with each other. Note that, the cutout portions 21b and 21c are provided at both the axial end portions of the inner surface 21 of the outer race 23.

Figure 42:
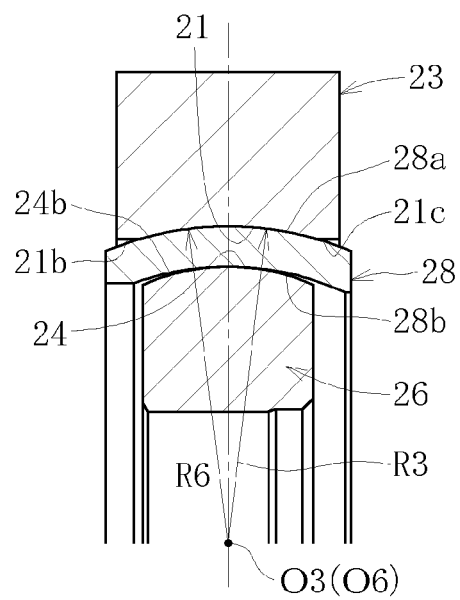
FIG. 42 is a sectional view of a main part of a fixed type constant velocity universal joint using an inner race of a second modified example.
Figure 43:
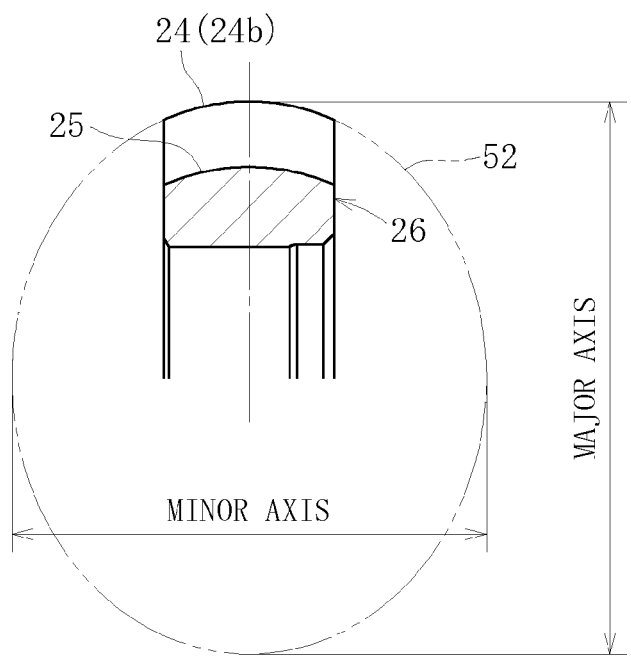
FIG. 43 is a sectional view of the inner race of the fixed type constant velocity universal joint in FIG. 42.

Next, FIG. 42 illustrates a fixed type constant velocity universal joint using an inner race 26 of a second modified example. The outer surface 24 of the inner race 26 is an elliptical surface 24b which forms a gap together with the inner spherical surface 28b of the cage 28. That is, the elliptical surface 24b is formed along an oval sphere surface of an ellipse 52 indicated by the two-dot chain line in FIG. 43.

The outer race 23 of the fixed type constant velocity universal joint using this inner race 26 is configured so that the curvature center O6 of the inner surface 21 thereof coincides with the curvature center O3 of the outer spherical surface 28a of the cage 28, and the curvature radius R6 of the inner surface 21 substantially coincides with the curvature radius R3 of the outer spherical surface 28a. With this, the outer spherical surface 28a of the cage 28 and the inner surface 21 of the outer race 23 are brought into sliding contact with each other.

As described above, the gap is formed between the outer surface 24 (24b) of the inner race 26 and the inner spherical surface 28b of the cage 28. In this manner, the circulation of the lubricant agent is promoted, the heat generation is prevented, and the durability is improved. Further, the outer spherical surface 28a of the cage 28 and the inner surface 21 of the outer race 23 are brought into sliding contact with each other. Therefore, the cage position is determined, and even in the case where there is no restriction of the cage 28 by the inner race 26, the function as the fixed type constant velocity universal joint can be stably exerted.

Figure 44:
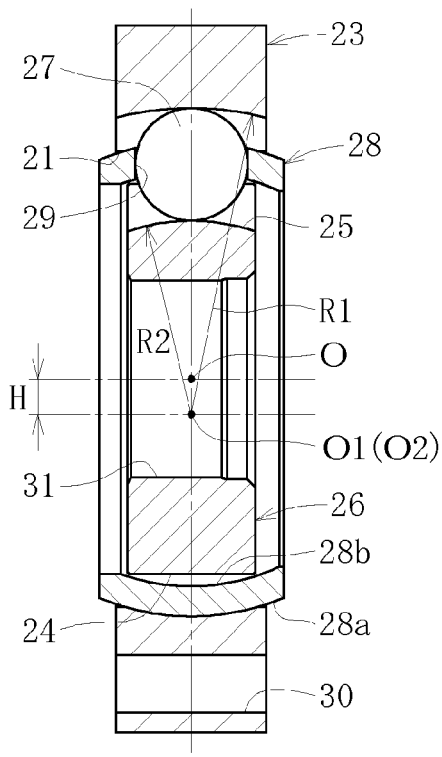
FIG. 44 is a sectional view of a fixed type constant velocity universal joint, illustrating a fifth embodiment of the present invention.
Figure 45:
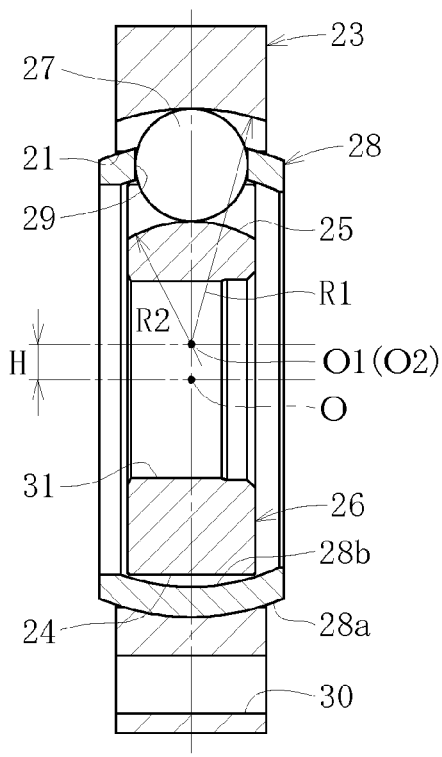
FIG. 45 is a sectional view of a fixed type constant velocity universal joint, illustrating a sixth embodiment of the present invention.

Further, in the case of the fixed type constant velocity universal joint which includes the inner race 26 having the outer surface 24 being a cylindrical surface, as illustrated in FIGS. 44 and 45, the curvature center O1 of the track groove 22 of the outer race 23 and the curvature center O2 of the track groove 25 of the inner joint member are shifted from the joint center O in the radial direction. In FIG. 44, the curvature centers O1 and O2 are shifted by the offset amount H with respect to the joint center O at positions more widely spaced apart from the track groove than the joint center O. Further, in FIG. 45, the curvature centers O1 and O2 are shifted by the offset amount H with respect to the joint center O at positions more approaching the track groove than the joint center O.

Figure 46:
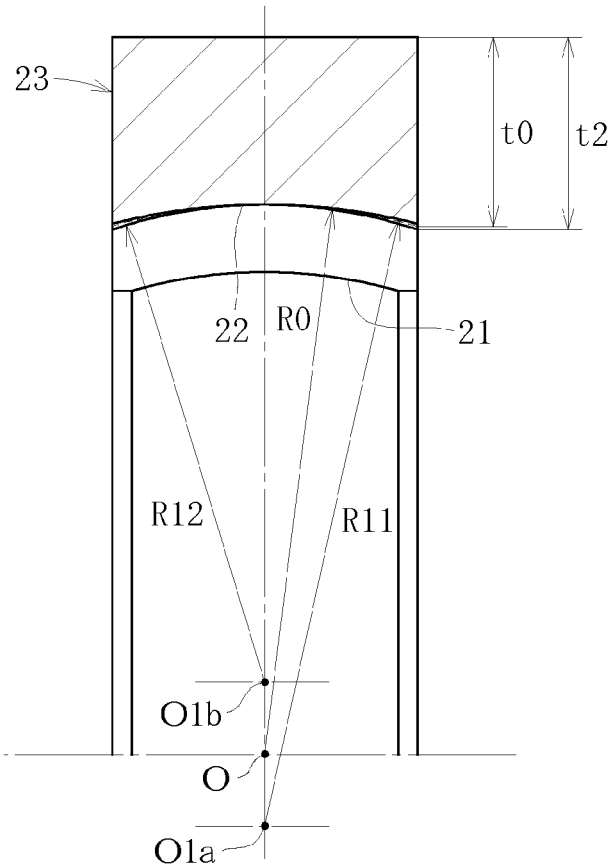
FIG. 46 is a sectional view of the outer race under a state in which a curvature center of a track groove is offset in a radial direction.
Figure 47:
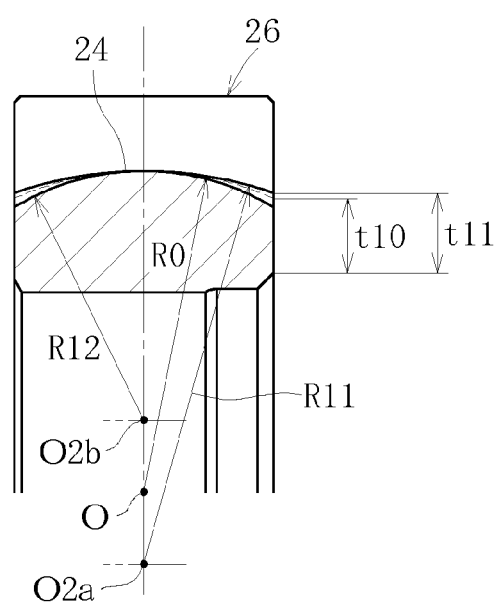
FIG. 47 is a sectional view of the inner race under a state in which a curvature center of a track groove is offset in a radial direction.

FIG. 46 illustrates a case where the curvature center O1 of the outer race 23 is arranged at a position more widely spaced apart from the track groove than the joint center O, and a case where the curvature center O1 thereof is arranged at a position more approaching the track groove than the joint center O. In FIG. 46, O1a represents the curvature center of the track groove 22 of the outer race 23, which is arranged at a position more widely spaced apart from the track groove than the joint center O, and O1b represents the curvature center of the track groove 22 of the outer race 23, which is arranged at a position more approaching the track groove than the joint center O. Further, FIG. 47 illustrates a case where the curvature center O2 of the inner race 26 is arranged at a position more widely spaced apart from the track groove than the joint center O, and a case where the curvature center O2 is arranged at a position more approaching the track groove than the joint center O. In FIG. 47, O2a represents the curvature center of the track groove 25 of the inner race 26, which is arranged at a position more widely spaced apart from the track groove than the joint center O, and O2b represents the curvature center of the track groove 25 of the inner race 26, which is arranged at a position more approaching the track groove than the joint center O.

Note that, in FIG. 46, t0 represents the thickness of the outer race at the axial end portion of the track groove 22 when the curvature center O1 of the track groove 22 coincides with the joint center O, and t2 represents the thickness of the outer race at the axial end portion of the track groove 22 when the curvature center O1 of the track groove 22 is more approaching the track groove than the joint center O. Further, in FIG. 47, t10 represents the thickness of the inner race at the axial end portion of the track groove 25 when the curvature center O2 of the track groove 25 coincides with the joint center O, and t11 represents the thickness of the inner race at the axial end portion of the track groove 25 when the curvature center O2 of the track groove 25 is more widely spaced apart from the track groove than the joint center O.

Therefore, there are produced actions and effects of a case where the curvature center O1 of the track groove 22 of the outer race 23 and the curvature center O2 of the track groove 25 of the inner joint member are shifted from the joint center O in the radial direction.

Hereinabove, description is made of the embodiments of the present invention. However, the present invention is not limited to the embodiments described above, and various modifications can be made thereto. For example, the present invention is not limited to the following cases where: the curvature center O1 of the track groove 22 of the outer race 23 and the curvature center O2 of the track groove 25 of the inner joint member are shifted from the joint center O in the radial direction; the inner surface 21 of the outer race 23 is a cylindrical surface; and the outer surface 24 of the inner race 26 is a cylindrical surface.

The number of balls is eight in the respective embodiments, but may be other than eight, for example, six or ten.

The fixed type constant velocity universal joint of the present invention is used in a power transmission system for automobiles and various industrial machines. The number of balls as a torque transmitting member is six, eight, ten, etc. The fixed type constant velocity universal joint of the present invention may be used in a propeller shaft for automobiles.

The invention claimed is:

1. A fixed type constant velocity universal joint, comprising:
   an outer joint member including an inner surface provided with first track grooves and second track grooves, each having an arcuate bottom surface; wherein
      the first track grooves of the outer joint member are formed circumferentially in the inner surface of the outer joint member, and are tilted in a first direction from a longitudinal center axis line, the tilt of the first track grooves of the outer joint member being at a predetermined angle, and
      the second track grooves of the outer joint member are formed circumferentially in the inner surface of the outer joint member so as to alternate with the first track grooves of the outer joint member, and are tilted in a second direction from the longitudinal center axis line, the tilt of the second track grooves of the outer joint member being at the predetermined angle,
      the first direction being opposite to the second direction;
   an inner joint member including an outer surface provided with first track grooves and second track grooves, each having an arcuate bottom surface; wherein
      the first track grooves of the inner joint member are formed circumferentially in the outer surface of the inner joint member, and are tilted in the first direction from the longitudinal center axis line, the tilt of the first track grooves of the inner joint member being at the predetermined angle, and
      the second track grooves of the inner joint member are formed circumferentially in the outer surface of the inner joint member so as to alternate with the first track grooves of the inner joint member, and are tilted in the second direction from the longitudinal center axis line, the tilt of the second track grooves of the inner joint member being at the predetermined angle;
   a plurality of torque transmitting balls each arranged in a ball track formed of a pair of one of the first and second track grooves of the outer joint member and a corresponding one of the first and second track grooves of the inner joint member; and
   a cage interposed between the inner surface of the outer joint member and the outer surface of the inner joint member, for retaining the plurality of torque transmitting balls, wherein:
   a curvature center of the first and second track grooves of the outer joint member and a curvature center of the first and second track grooves of the inner joint member have an offset of 0 in an axial direction; and
   the inner surface of the outer joint member is a spherical surface which is configured to slide upon an outer spherical surface of the cage, and the outer surface of the inner joint member is a cylindrical surface.

2. A fixed type constant velocity universal joint according to claim 1, wherein a number of the plurality of torque transmitting balls is six, eight, or ten.

3. A fixed type constant velocity universal joint according to claim 1, wherein the curvature center of each of the first and second track grooves of the outer joint member and the curvature center of each of the first and second track grooves of the inner joint member are shifted from a joint center in a radial direction.

4. A fixed type constant velocity universal joint, comprising:
   an outer joint member including an inner surface provided with first track grooves and second track grooves, each having an arcuate bottom surface; wherein
      the first track grooves of the outer joint member are formed circumferentially in the inner surface of the outer joint member, and are tilted in a first direction from a longitudinal center axis line, the tilt of the first track grooves of the outer joint member being at a predetermined angle, and
      the second track grooves of the outer joint member are formed circumferentially in the inner surface of the outer joint member so as to alternate with the first track grooves of the outer joint member, and are tilted in a second direction from the longitudinal center axis line, the tilt of the second track grooves of the outer joint member being at the predetermined angle,
      the first direction being opposite to the second direction;
   an inner joint member including an outer surface provided with first track grooves and second track grooves, each having an arcuate bottom surface; wherein
      the first track grooves of the inner joint member are formed circumferentially in the outer surface of the inner joint member, and are tilted in the first direction from the longitudinal center axis line, the tilt of the first track grooves of the inner joint member being at the predetermined angle, and
      the second track grooves of the inner joint member are formed circumferentially in the outer surface of the inner joint member so as to alternate with the first track grooves of the inner joint member, and are tilted in the second direction from the longitudinal center axis line, the tilt of the second track grooves of the inner joint member being at the predetermined angle;
   a plurality of torque transmitting balls each arranged in a ball track formed of a pair of one of the first and second track grooves of the outer joint member and a corresponding one of the first and second track grooves of the inner joint member; and a cage interposed between the inner surface of the outer joint member and the outer surface of the inner joint member, for retaining the plurality of torque transmitting balls, wherein:

a curvature center of the first and second track grooves of the outer joint member and a curvature center of the first and second track grooves of the inner joint member have an offset of 0 in an axial direction; and the inner surface of the outer joint member is a spherical surface which is configured to slide upon an outer spherical surface of the cage, and the outer surface of the inner joint member is a spherical surface which forms a gap together with an inner spherical surface of the cage.

5. A fixed type constant velocity universal joint according to claim 4, wherein a number of the plurality of torque transmitting balls is six, eight, or ten.

6. A fixed type constant velocity universal joint according to claim 4, wherein the curvature center of each of the first and second track grooves of the outer joint member and the curvature center of each of the first and second track grooves of the inner joint member are shifted from a joint center in a radial direction.

7. A fixed type constant velocity universal joint, comprising:

an outer joint member including an inner surface provided with first track grooves and second track grooves, each having an arcuate bottom surface; wherein the first track grooves of the outer joint member are formed circumferentially in the inner surface of the outer joint member, and are tilted in a first direction from a longitudinal center axis line, the tilt of the first track grooves of the outer joint member being at a predetermined angle, and the second track grooves of the outer joint member are formed circumferentially in the inner surface of the outer joint member so as to alternate with the first track grooves of the outer joint member, and are tilted in a second direction from the longitudinal center axis line, the tilt of the second track grooves of the outer joint member being at the predetermined angle, the first direction being opposite to the second direction;

an inner joint member including an outer surface provided with first track grooves and second track grooves, each having an arcuate bottom surface; wherein the first track grooves of the inner joint member are formed circumferentially in the outer surface of the inner joint member, and are tilted in the first direction from the longitudinal center axis line, the tilt of the first track grooves of the inner joint member being at the predetermined angle, and the second track grooves of the inner joint member are formed circumferentially in the outer surface of the inner joint member so as to alternate with the first track grooves of the inner joint member, and are tilted in the second direction from the longitudinal center axis line, the tilt of the second track grooves of the inner joint member being at the predetermined angle;

a plurality of torque transmitting balls each arranged in a ball track formed of a pair of one of the first and second track grooves of the outer joint member and a corresponding one of the first and second track grooves of the inner joint member; and a cage interposed between the inner surface of the outer joint member and the outer surface of the inner joint member, for retaining the plurality of torque transmitting balls, wherein:

a curvature center of the first and second track grooves of the outer joint member and a curvature center of the first and second track grooves of the inner joint member have an offset of 0 in an axial direction; and the inner surface of the outer joint member is a spherical surface which is configured to slide upon an outer spherical surface of the cage, and the outer surface of the inner joint member is an elliptical surface which forms a gap together with an inner spherical surface of the cage.

8. A fixed type constant velocity universal joint according to claim 7, wherein a number of the plurality of torque transmitting balls is six, eight, or ten.

9. A fixed type constant velocity universal joint according to claim 7, wherein the curvature center of each of the first and second track grooves of the outer joint member and the curvature center of each of the first and second track grooves of the inner joint member are shifted from a joint center in a radial direction.

* * * * *